United States Patent
Leigh et al.

(10) Patent No.: US 11,617,029 B2
(45) Date of Patent: Mar. 28, 2023

(54) STACKABLE WAVEGUIDE SHUFFLE BLOCKS AND SYSTEMS AND METHODS OF IDENTIFYING SAME

(71) Applicant: HEWLETT PACKARD ENTERPRISE DEVELOPMENT LP, Houston, TX (US)

(72) Inventors: Kevin B. Leigh, Houston, TX (US); Paul Kessler Rosenberg, Palo Alto, CA (US); Stanley Cheung, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 191 days.

(21) Appl. No.: 16/912,308

(22) Filed: Jun. 25, 2020

(65) Prior Publication Data
US 2021/0409846 A1    Dec. 30, 2021

(51) Int. Cl.
*H04Q 11/00*    (2006.01)
*G02B 6/35*    (2006.01)

(52) U.S. Cl.
CPC ......... *H04Q 11/0005* (2013.01); *G02B 6/356* (2013.01); *G02B 6/3554* (2013.01);
(Continued)

(58) Field of Classification Search
CPC ........ H04Q 11/0005; H04Q 2011/0011; H04Q 2011/0015; H04Q 2011/0016;
(Continued)

(56) References Cited

U.S. PATENT DOCUMENTS 9,442,253 B2    9/2016 Rosenberg et al.
9,599,784 B2    3/2017 Benner et al.
(Continued)

FOREIGN PATENT DOCUMENTS

| DE | 102020111150 | * | 10/2021 | .............. G02B 6/43 |
| EP | 3357180 B1 | * | 4/2022 | .............. H04J 14/02 |
| FR | 3013127 | * | 5/2015 | .......... G02B 6/3829 |
| FR | 3013127 A1 | * | 5/2015 | .......... G02B 6/4455 |
| KR | 20210122400 A | * | 10/2021 | .............. H04J 14/02 |
| WO | WO-2017/066140 | * | 4/2017 | |

OTHER PUBLICATIONS

Richard Soref, "Tutorial: Integrated-photonic switching structures", APL Photonics, vol. 3, 021101, Jan. 29, 2018, pp. 021101-1-021101-18.

*Primary Examiner* — Leslie C Pascal
(74) *Attorney, Agent, or Firm* — Sheppard Mullin Richter & Hampton LLP

(57) ABSTRACT

Waveguide shuffle blocks (WSBs) are provided that may incorporate waveguides routed in any pattern to effectuate many-to-many connectivity between optical cables/fibers or other WSBs connected thereto. Such WSBs may be configured in ways that allow the WSBs to be stacked and to achieve effective optical cable/fiber organization. Moreover, such WSBs may include readable tags that can provide information regarding a particular WSB configuration and/ or what optical cables/fibers are connected so that network topology can be discovered and monitored. Some WSBs may be configured as wavelength shifting shuffles (WSSs) that allow a particular wavelength(s) of an optical signal(s) to be routed as desired and/or alter a first wavelength associated with a particular optical signal to a second wavelength. In other embodiments WSSs can be configured to allow for wavelength multiplexing/demultiplexing.

13 Claims, 23 Drawing Sheets

(52) U.S. Cl.
CPC .... *G02B 6/3562* (2013.01); *H04Q 2011/0011* (2013.01); *H04Q 2011/0015* (2013.01); *H04Q 2011/0016* (2013.01); *H04Q 2011/0022* (2013.01); *H04Q 2011/0024* (2013.01); *H04Q 2011/0032* (2013.01)

(58) Field of Classification Search
CPC ... H04Q 2011/0022; H04Q 2011/0024; H04Q 2011/0032; G02B 6/3554; G02B 6/356; G02B 6/3562; G02B 6/3897; G02B 6/29338; G02B 6/3895; G02B 6/12007; G02B 6/30
See application file for complete search history.

(56) References Cited

U.S. PATENT DOCUMENTS

| | | | |
|---|---|---|---|
| 10,169,288 B2 | 1/2019 | Colgan et al. | |
| 10,338,320 B2 | 7/2019 | Way et al. | |
| 2002/0159688 A1* | 10/2002 | Kim | G02B 6/12004 |
| | | | 385/24 |
| 2018/0070157 A1 | 3/2018 | Menard et al. | |
| 2019/0384005 A1* | 12/2019 | Brusberg | G02B 6/3846 |
| 2020/0264394 A1* | 8/2020 | Chase | H04B 10/801 |
| 2021/0018697 A1* | 1/2021 | Evans | G02B 6/4472 |

* cited by examiner

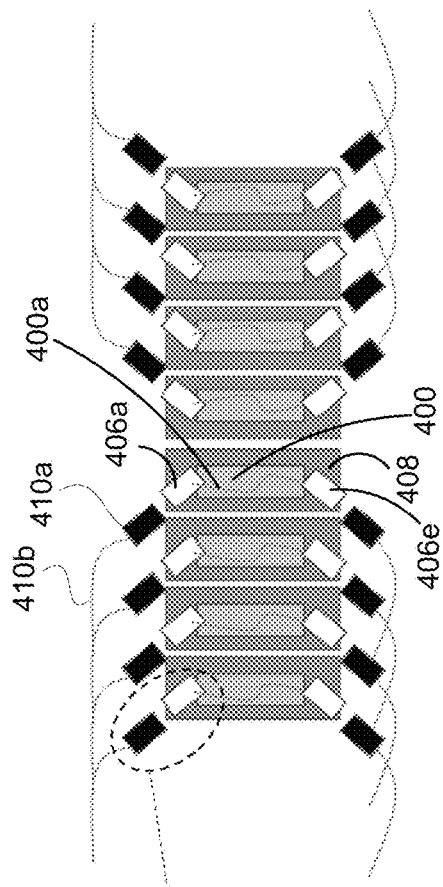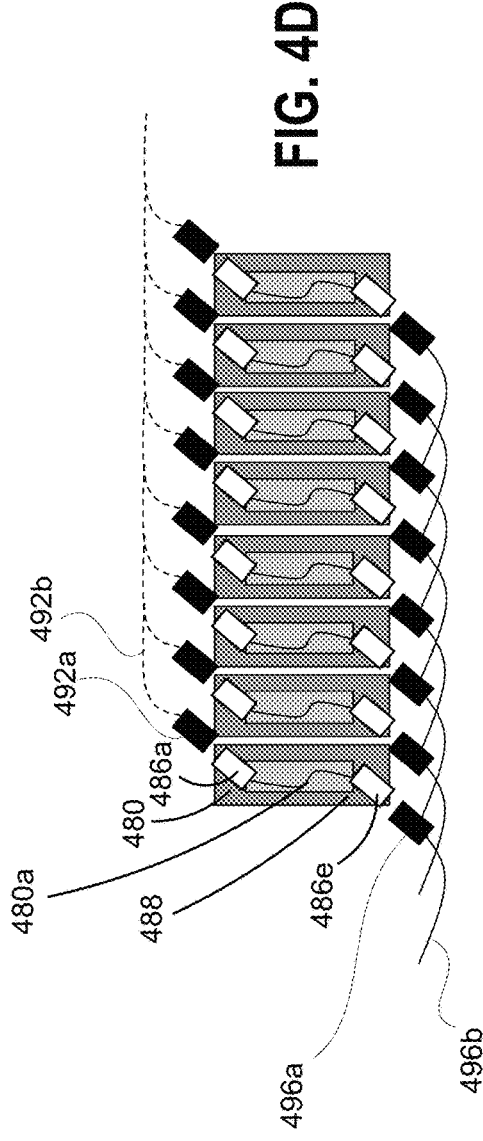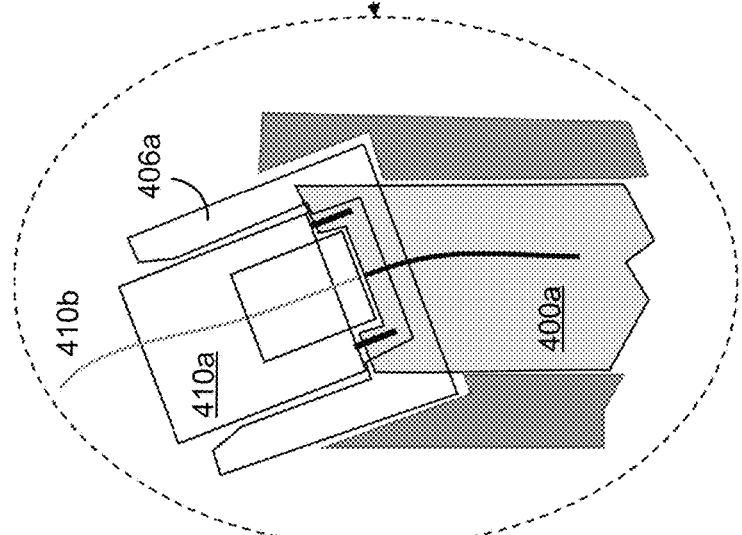

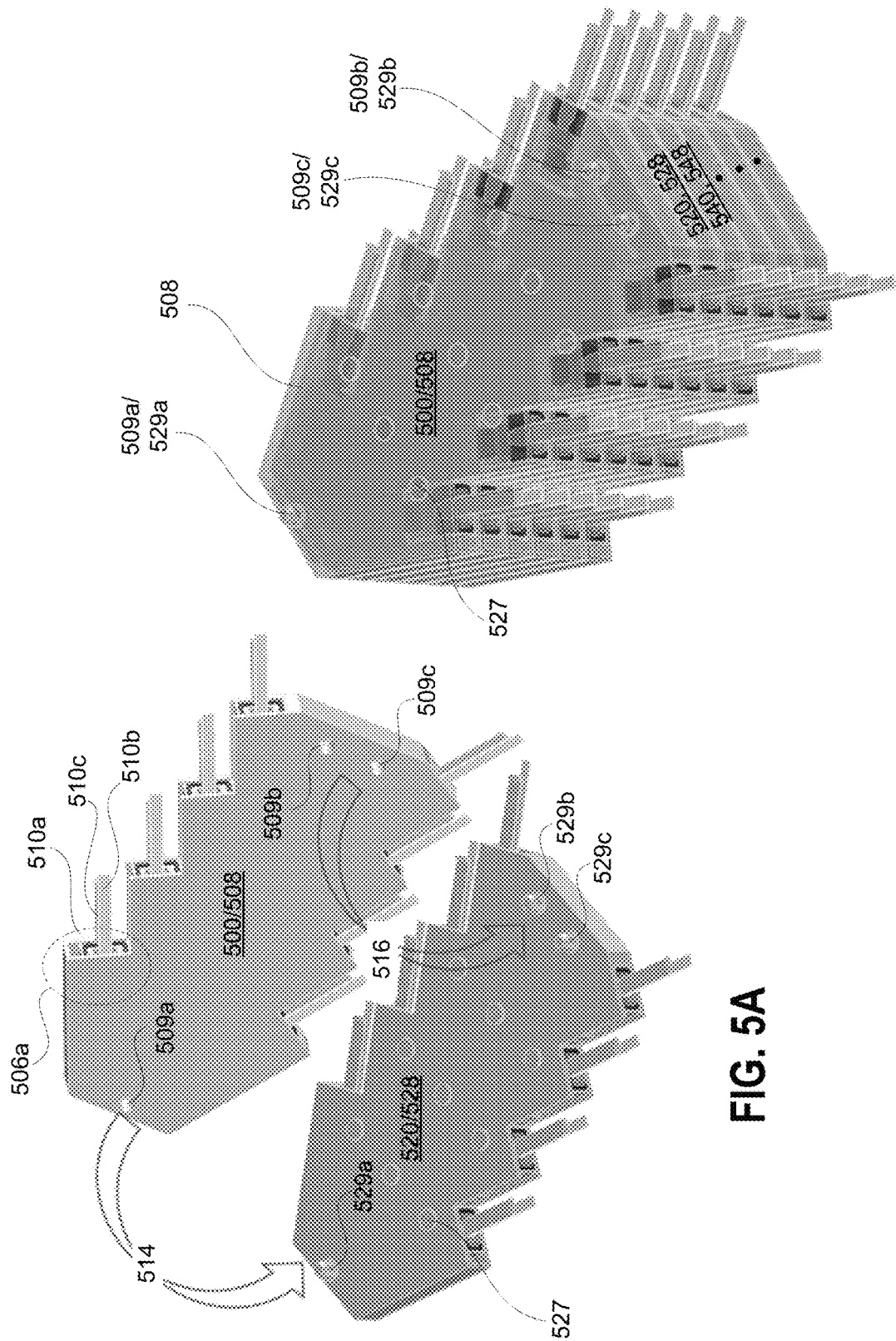

STACKABLE WAVEGUIDE SHUFFLE BLOCKS AND SYSTEMS AND METHODS OF IDENTIFYING SAME

BACKGROUND

External optical cables and shuffle boxes are used to provide complex connection topologies for systems, such as server systems. As chips have started integrating photonics for optical connections in place of electrical connections, optical fiber shuffles that support such optical connections and provide intra-system connectivity are more in demand. Conventional optical fiber shuffles typically include an optical patch panel. The optical patch panel includes multiple connectors and optical fibers routed between each of an independent optical connector for an optical cable and a shuffling box disposed in the optical patch panel. In an optical connection topology, all-to-all optical connections are employed, such that signal routing can be achieved with simpler and easier to service optical switches at lower costs.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4C is top, transparent view of a waveguide shuffle block stack according to some embodiments.

FIG. 4D is top, transparent view of a waveguide shuffle block stack according to some embodiments.

FIG. 5A illustrates stacking of example waveguide shuffle blocks according to some embodiments.

FIG. 5B is a perspective, transparent view of an example waveguide shuffle block stack according to some embodiments.

DETAILED DESCRIPTION

Figure 1:
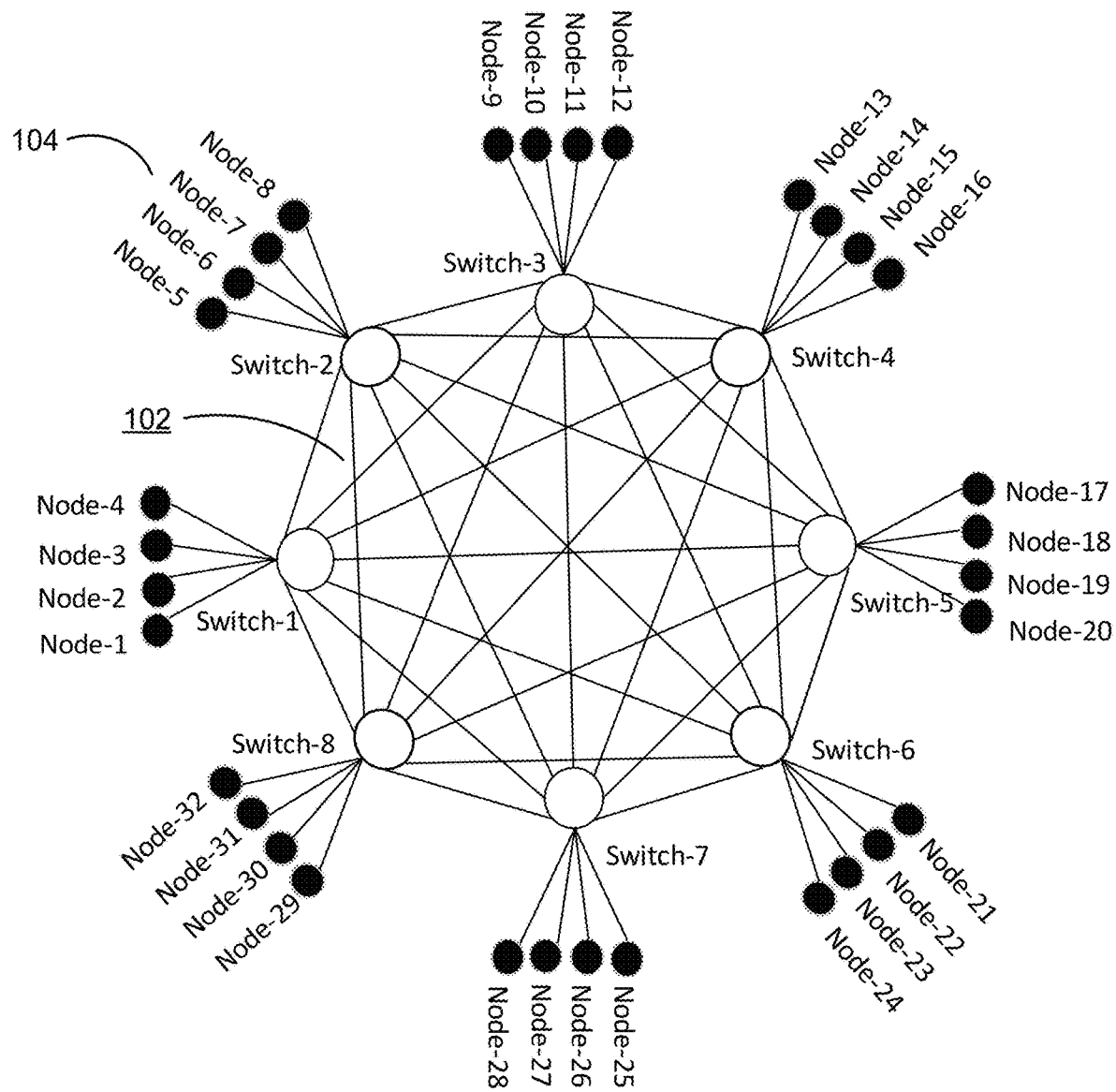
FIG. 1 is a schematic diagram illustrating an example topology achieving all-to-all connections of optical interlinks of switches.

As alluded to above, optical cables and shuffle boxes are used to provide complex connection topologies for systems, such as server systems. For example, all-to-all connections amongst large numbers of high-radix switches are increasingly being deployed as high performance computing (HPC) and artificial intelligence (AI) systems become more and more popular for high-bandwidth low-latency applications. Passive optical fibers are commonly used to interconnect high-speed signals across multiple racks, and fiber shuffle devices are used in the form of breakout cables, and breakout cartridges in custom shuffle boxes and racks.

However, conventional optical shuffles (shuffle trays, boxes, racks) or implementations thereof tend to be large, can be difficult to install, and can be expensive to produce. This is disadvantageous when considering that high-density fibers are increasingly relied on to support various fabric topologies (FatTree, DragonFly, HyperX, etc.) within systems, and egressing therefrom. For example, passive fiber components, such as fiber shuffle devices, can cost more than the switch application-specific integrated circuits (ASICs) the fiber shuffle devices are to interconnect. Implementation of such conventional fiber shuffles (which separate multiple optical fibers from each parallel-fiber connector (e.g., an MPO connector with an MT ferrule), and effectuate connection to multiple other optical connectors (e.g., LC Duplex connectors) to which optical fibers may be routed. The routing of optical fibers is typically performed manually, or require the use of mechanical robots programmed with fiber routes, and the fiber shuffles themselves have a fixed configuration and cannot be adapted for use with different fiber lengths, different connection topologies, etc. As another example, patch panels that are typically used to couple arrays of optical fibers to each other use faceplate connectors often have large space requirements, and are difficult not only to install, but also to access and/or service due to the number and complexity of the connections.

In accordance with various embodiments, the fiber stages between nodes and switches can be eliminated by the use of a waveguide shuffle block (WSB) configured in accordance with various embodiments.

Each WSB may comprise laser-written waveguides routed in any pattern providing many-to-many connectivity amongst a plurality of ferrule interface structures. It should be understood that many-to-many connectivity may encompass a variety of many-to-many implementations, e.g., all-to-all connectivity, custom many-to-many connectivity, etc. A ferrule interface structure may be a parallel-fiber ferrule, a duplex-fiber ferrule or a simplex-fiber ferrule structure. In some embodiments, a ferrule interface structure may protrude from a side wall of a WSB, and the ferrule interface structure can be orientated at an angle relative to the WSB side wall, e.g., an acute (less than 90 degree) angle. In some embodiments, ferrule interface structures may be implemented on/along multiple sides of a multi-sided WSB (e.g., a four-sided WSB having a square or rectangular cross-section, a five-sided WSB having a pentagonal cross-section, an eight-sided WSB having an octagonal cross-section, and so on). The direction in which ferrule interface structures can protrude can be same. The direction in which ferrule interface structures can also differ, e.g., where a first set of ferrule interface structures along a first side of the WSB may be oriented in a first direction, while a second set of ferrule interface structures along a second side of the WSB may be oriented in a second direction.

Each WSB may be encapsulated with a housing that provides an optical connector/ferrule interface opening that corresponds to a ferrule interface structure. The housing may have a cascading feature to allow the housings, each encapsulating a WSB, to be interconnected, such as in a stacked configuration. For example, each housing may have complimentary interlocking elements to adjacent surfaces of each housing to be connected to each other. The complimentary interlocking elements may be a mechanical shape(s), some magnetic material, etc. Each housing may further comprise a coupling feature to allow stacked housings to be secured to a system chassis or a cable plenum.

Moreover, each WSB may have an information tag that a shuffle stack controller, disposed in a base structure assembly supporting stacked WSBs, can read using tag reader circuitry via a corresponding tag reader antennae communicating with the tag. The same can be done for individual connectors, where each connector has a connector tag and a corresponding tag reader antenna relaying the connector tag information can be read by connector tag reader circuitry supported on the shuffle stack controller. In this way, each connector that can be detected with software/hardware management devices to collate fiber connection details for operational management purposes, such as to verify connection topology and correctness after the initial installations or after a service/update operation, to collate connector types, connection stages and fiber lengths along an end-to-end connected path to estimate potential total optical signal losses and verify against optical transceiver optical link power budget, for inventory, etc. Non-limiting examples of optical cable connectors that may be used include MPO parallel-fiber connectors (with various types of MT ferrules), MXC parallel-fiber connectors with lensed ferrules, LC simplex-fiber connectors, LC duplex-fiber connectors (with uni-boot or dual-boot cables), MDC duplex-fiber connectors, SN duplex-fiber connectors, CS duplex-fiber connectors, among others. The technology disclosed herein is not limited to any specific type of optical cable connector and can be configured to work with any type of optical cable connector used now or in the future. Similarly, various embodiments may be utilized with most if not all types of optical fibers or cables, e.g., multi-mode fiber, single-mode fiber, multi-core fiber, fiber having one or more transmit wavelengths and companion fiber having one or more receive wavelengths (duplex pair), etc. The physical characteristics and/or numbers of fiber(s) in a cable or terminated at a ferrule can vary.

In accordance with some embodiments, a WSB may comprise a wavelength-shifting shuffle (WSS), where an optical wavelength of a wavelength set or a waveguide can be routed from a source optical connector to a destination optical connector via one or more wavelength couplers. Wavelength couplers may be tuned for or to a specific wavelength for selectively coupling optical signals having a particular wavelength. In some embodiments, such wavelength couplers can be controlled using wavelength coupler control logic. Wavelength couplers can be micro-ring wavelength couplers, Mach-Zehnder Interferometer (MZI)-type wavelength couplers, etc. Such embodiments improve upon traditional methods that require converting optical signals to electrical signals, handling sorting out destinations for the electrical signals, and subsequently re-converting the electrical signals back to optical signals, inasmuch as these traditional methods involve longer latency, higher power consumption, and higher cost.

FIG. 1 is a schematic diagram 100 illustrating an example topology achieving all-to-all connections of optical inter-links of switches according to some embodiments. In the example shown in FIG. 1, the example topology includes all-to-all optical inter-switch link (ISL) cluster 102 and a plurality of nodes 104 connected to each of the switches included in the all-to-all ISL cluster 102. In the example of FIG. 1, the all-to-all ISL cluster 102 represents connectivity among a plurality of switches in an all-to-all manner. In some embodiments, all-to-all connections mean that each switch in an ISL cluster has a direct connection to all the other switches in the ISL cluster without passing thorough any other switches. In the present disclosure, in achieving the all-to-all connections of switches, an ISL cluster with non-hierarchical direct connections of switches is employed. Depending on the specific implementation, multiple connections may exist, which means that a plurality of optical links connecting the same pair of switches may exist for higher bandwidth. According to the ISL cluster with non-hierarchical direct connections of switches, all-to-all connections of switches can lead to low-latency high-bandwidth multi-path communication fabric.

In the example of FIG. 1, each of the plurality of nodes 104 represents a computing node configured to perform communication with another computing node through the all-to-all ISL cluster 102. For example, the computing node may include a server computing device, an accelerator device, a storage device, a memory device, and so on. Depending on the specific implementation, one or more nodes 104 are connected to each of the switches of the all-to-all ISL cluster 102.

Figure 2:
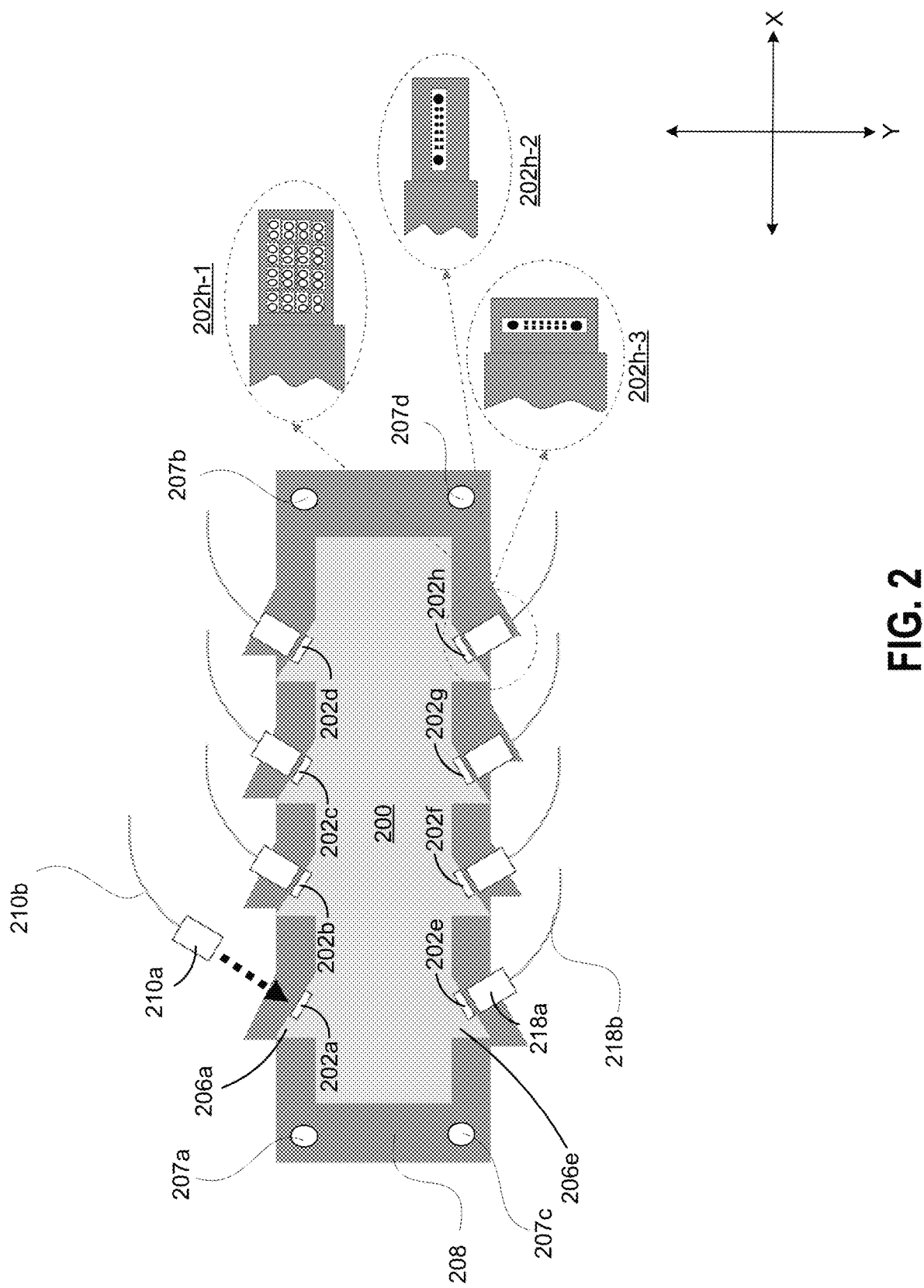
FIG. 2 is a top view of an example waveguide shuffle block according to some embodiments.

FIG. 2 illustrates a top view of an example WSB and housing to which fiber ferrules can be connected in accordance with various embodiments. As illustrated in FIG. 2, an example WSB 200 may comprise a glass plate on which one or more waveguides (not illustrated in FIG. 2) are disposed (e.g., a Glass-as-a-Platform (GaaP) design) that allows electrical components to be disposed directly on glass plates to allow management functions. The one or more waveguides can be created through ion exchange, ion implantation, UV irradiation, laser writing, or any other method of disposing waveguides within a glass plate. In various embodiments, one or more of the glass plates may include a shaped and/or protrusion to accommodate one or more optical cable ferrule interfaces configured to mate with one or more types of optical ferrules housed within corresponding optical connectors and align the fiber positions of the ferrule of the optical cable connector with the corresponding waveguides of the glass plate. Although various embodiments are described as using a glass plate to implement a WSB, e.g., a borosilicate glass plate, other appropriate materials that are known or may be discovered, such as polymer materials, combinations thereof, etc. can be utilized.

As will be described below, a connector can encase one or multiple ferrules, and a ferrule may encase one or multiple fibers. In other words, a connector can be a housing for one or more ferrules. A connector may have initial alignment and retention features when it is mated to a complimentary connector housing on one side, and may have cable retention features on the other side (e.g., cable boot). A connector retention feature may also include engaging/disengaging features, e.g., push-pull tab, sleeve or rod.

One end of a ferrule may have final alignment features and can have various ways on its end face to opto-mechanically couple with a mating surface (such as a ferrule interface etched on a glass plate) or a like-ferrule on the opposite side. The other end of a ferrule has fibers attachment features, e.g., epoxy. When a fiber is "terminated" on a ferrule, the fiber is first cleaved, then stripped, and inserted within a fiber hole in a ferrule. "Physical contact" type ferrules (be they single-fiber or parallel-fiber) have a cladded fiber core that protrudes through each fiber hole, and the buffer portion of the fiber is where epoxy is applied for the ferrule to retain the fiber. In some examples, the end-face of a ferrule with fiber(s) protruding may be polished to have a certain geometry, e.g., flat, angle, etc. In other examples, the end-face of a ferrule may have to be processed, e.g., coated anti-reflection material, glued-on low-loss material, etc. Lens ferrules do not have holes for fibers to protrude through but rather have a lens on their end face, where the cleaved fibers are carefully aligned (e.g., in v-grooves) and epoxied in position.

Example optical cable ferrule interfaces are illustrated in FIG. 2, i.e., optical cable ferrule interfaces 202a-202h. Each of optical cable ferrule interfaces 202a-202h may receive or connect to an optical cable ferrule that terminates an optical cable(s)/fiber(s). For example, FIG. 2 illustrates optical cable connectors 210a and 218a in which fiber ferrules terminate fibers within optical cables 210b and 218b, respectively. Each of optical cable ferrule interfaces 202a-202h may be aligned with a corresponding connector socket disposed on the housing 208 to receive and matingly connect with optical cable connectors, e.g., optical cable connectors 210a and 218a. It should be noted that not all optical cable connectors and interfaces have been labeled for the sake of clarity of FIG. 2.

In various embodiments, an optical cable connector, such as optical cable connector 210a, may expose a fiber core of a fiber within an optical cable, e.g., optical cable 210b, within each optical cable connector, whereas in other embodiments, a lens may be disposed to align with a fiber core within each optical cable connector. In various embodiments, the one or more optical cable connector, e.g., 210a and 218a may be configured such that, when connected, the position of a fiber core of respective optical cables 210b and 218b (whether exposed or having a lens disposed) therein are aligned with a corresponding lens that is associated with a waveguide of the glass plate. It should be understood that the connection between an optical cable ferrule, e.g., that exposed in optical cable connector 210a, and an optical cable ferrule interface, e.g., 202a, may be an opto-mechanical connection coupling an optical cable, e.g., optical cable 210b to a waveguide of WSB 200. Example implementations of optical cable ferrule interface 202h are illustrated in exploded view, e.g., optical cable ferrule interface 202h-1 which is illustrated to be a duplex-fiber ferrule, optical cable ferrule interface 202h-2 which is illustrated to be a vertically-oriented parallel-fiber ferrule, and optical cable ferrule interface 202h-3 which is illustrated to be a horizontally-oriented parallel-fiber ferrule. It should be understood that a variety of orientations and/or counts (the number of optical fiber positions) can be configured as would be understood by those of ordinary skill in the art.

In some embodiments, WSB 200 may comprise multiple glass plates, e.g., an upper glass plate and a lower glass plate oriented parallel to each other. In some embodiments, the upper and lower glass plates may be separated by a spacer (not shown) that can be a structural spacer or air gap. Referring to the above-mentioned duplex-fiber ferrule interface contemplated in accordance with one embodiment, the upper glass plate may be configured to carry transmit signals with its waveguides, while the lower plate glass may be configured to carry receive signals with its waveguides. In some embodiments, the polarity of the glass plates (i.e., transmit-only, receive-only) can be switched.

In the example illustrated in FIG. 2, WSB 200 may include protrusions, in this case triangular protrusions to accommodate optical cable ferrule interfaces to which optical cable ferrules may connect. For example, FIG. 2 illustrates optical cable ferrule connector structures 206a and 206e. It should be noted that for clarity reasons, not all the illustrated optical cable ferrule connector structures are labeled. It should be understood, and as will be discussed below, various orientations/implementations of optical cable ferrule connector structures are contemplated herein. In this example, optical cable ferrule connector structures 206a and 206e (and the other optical cable ferrule connector structures) are configured and oriented such that each optical cable, e.g., optical cables 210b and 218b, can connect to WSB 200 at an acute angle to reduce the space needed to accommodate multiple optical cable connections. Moreover, the angle at which optical cables can attach to a WSB can result in cleaner, less cluttered installations or deployments, as well as easy ingress/egress of optical cabling/fibers.

WSB 200 may be encapsulated by a housing 208, which may be a plastic housing or a housing made of other materials, e.g., metal, or a combination thereof. Housing 208 may provide structural support for WSB 200 as well as coupling features 207a-d (collectively, 207) and coupling features (to engage with adjacent housings). Housing 208 may also have features for optical cable connector sockets for respective optical cable connectors to be inserted. It should be appreciated that the housing 208 can follow/comport with the shape of WSB 200. Although various embodiments described and illustrated herein comprise a WSB that is fully enclosed within a housing (except for apertures at the optical cable ferrule connector structure for receiving optical cable connectors), housing 208 may be implemented in a variety of ways, where, e.g., not all of WSB 200 is necessarily enclosed therein.

Figure 3A:
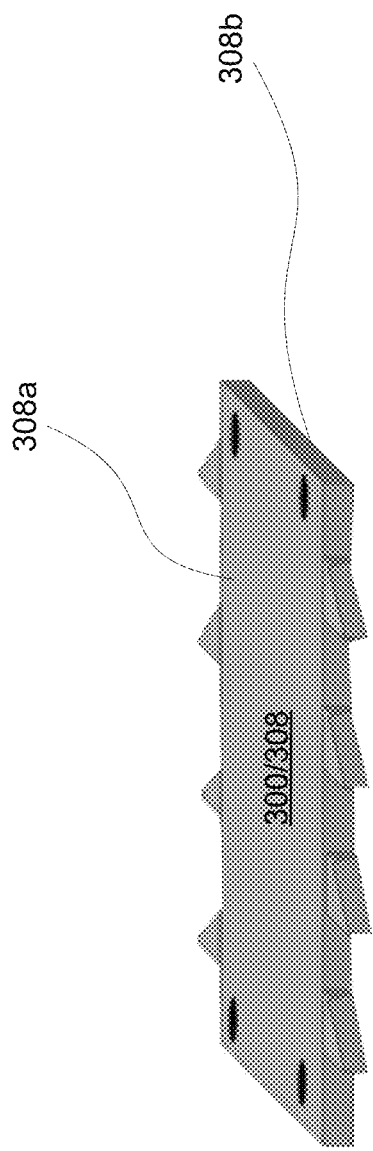
FIG. 3A is a perspective view of the example waveguide shuffle block of FIG. 2.
Figure 3B:
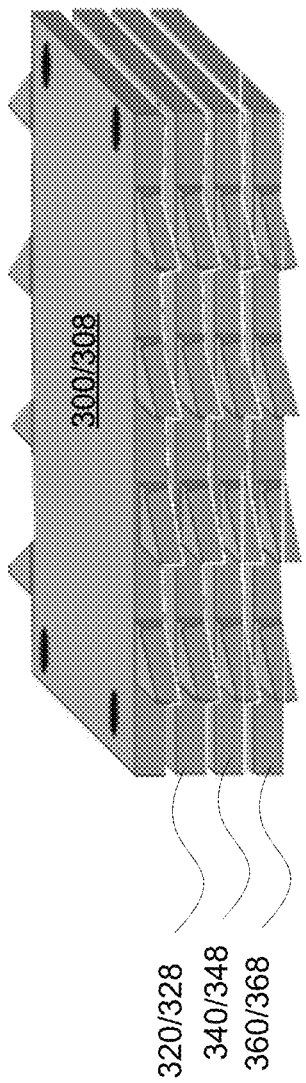
FIG. 3B is a perspective view of a stacked configuration of a plurality of the example waveguide shuffle block of FIG. 2.

FIG. 3A illustrates an example WSB housing 308, which may be an embodiment of housing 208 of FIG. 2. WSB housing 308 may encapsulate a WSB 300 (similar to the manner illustrated in FIG. 2). As alluded to above, WSBs configured in accordance with various embodiments may be stacked to achieve a smaller footprint/form factor of fiber shuffles compared to conventional fiber shuffle implementations, while still allowing for the requisite and/or desired organization. FIG. 3B illustrates an example stack of WSBs/WSB housings 300/308, 320/328, 340/348, and 360/368 encompassing respective WSBs being shown. As can be appreciated, a WSB encapsulated by a WSB housing, such as WSB housing 308 encapsulating WSB 300 may comprise a glass plate(s) in which laser-written waveguides are implemented (similar to WSB 200). The WSB 300 encapsulated by WSB housing 308 may be oriented such that the top and bottom surfaces of WSB housing 308 (308a, 308b respectively) are parallel to respective top and bottom surfaces of the WSB 300 encapsulated therein.

However, other orientations/configurations are contemplated. For example, FIG. 4A illustrates another example implementation of a WSB housing 408 (that again, encapsulates a WSB 400 therein). However, in contrast to FIG. 3A, for example, the orientation of WSB housing 408 (and the WSB 400 enclosed therein) is a vertical orientation, where planar surfaces commensurate with the planar surfaces on which the waveguides of the WSB 400 are written, etched, or otherwise effectuated, face to the left and right (as opposed to the top/bottom directions). Moreover, in contrast to the example of FIG. 2 (and FIG. 3), where the angular orientation of each optical cable connector structure is co-planar with the top/bottom surfaces of the WSB housing, as illustrated in FIG. 4A, the angular orientation of each optical cable connector structure 406a-406h (406b-d being hidden from view) can also be orthogonal to, in this example, the left and right surfaces of WSB housing 408. It should be understood that horizontal/vertical/left/right directions are merely relative, and still other orientations/configurations are contemplated in accordance with still other embodiments.

Figure 4B:
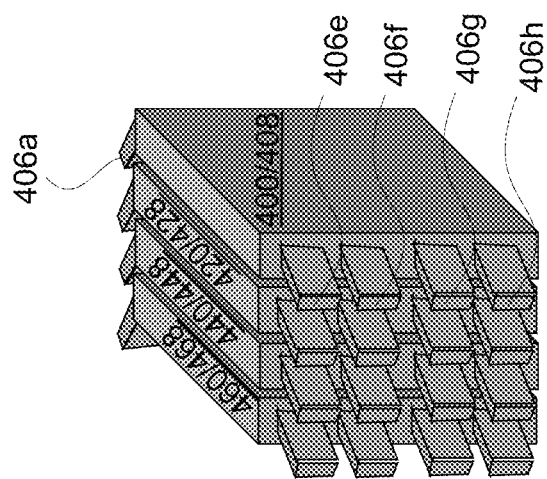
FIG. 4B is a perspective view of a stacked configuration of a plurality of the example waveguide shuffle block of FIG. 4A.
Figure 4A:
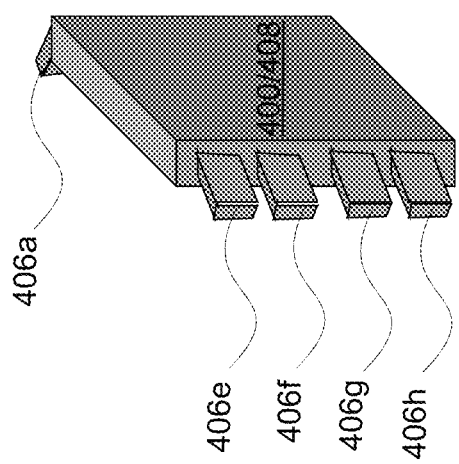
FIG. 4A is a perspective view of another example waveguide shuffle block according to some embodiments.

FIG. 4B illustrates a plurality of WSBs/WSB housings (400/408, 420/428, 440/448, 460/468), which may also be referred to as a WSB assembly, stacked together in one example vertical orientation. In the example stack of FIG. 4B, each optical cable ferrule interface is oriented in the same direction with the same angled orientation relative to the WSB/WSB housing. In this example, all the optical cable ferrule interfaces are oriented at an acute, left-facing angle. Thus, all optical cables/fibers to be connected to WSB/WSB housings 400/408, 420/428, 440/448, 460/468 would ingress each of WSB/WSB housings 400/408, 420/428, 440/448, 460/468 from the left.

FIG. 4C illustrates a top, transparent view of an example stack of WSBs/WSB housings. FIG. 4C illustrates a first set (from left to right) of four WSBs/WSB housings, including WSB 400/WSB housing 408. WSB 400 may comprise a plurality of waveguides, one of which, waveguide 400a, is shown thereon. WSB 400 may comprise optical cable connector sockets 406a and 406e. Optical cable connector socket 406a may receive an optical cable connector 410a for connecting an optical fiber 410b to WSB 400. Each of the optical cable ferrule interfaces on each of the WSBs may have an angled face that is parallel to the mating end face of the corresponding optical cable ferrule as shown in FIG. 4C insert. The optical cable connector sockets may be installed within a WSB housing, or they may be integral parts of the WSB housing. The orientation of the optical cable connector sockets of the first set of WSBs/WSB housings, e.g., optical cable connector socket 406a and 406e, may be left-facing. In the example of FIG. 4C, a second set (from left to right) of another four WSBs/WSB housings may each have one or more optical cable connector sockets (unlabeled) that are right-facing. It should be understood that the number of optical cable connector sockets implemented in a single WSB can vary. It should be further understood that the number of optical cable connector sockets implemented in each WSB of a stack of WSBs can vary. For example, a first WSB of a stack of WSBs may have eight optical cable connector structures, while a second WSB of the same stack of WSBs may have only 6 optical cable connector sockets. Additionally, a WSB need not have an even number of optical cable connector sockets, or an even number of optical cable connector sockets on opposing sides/surfaces of the WSB. Thus, in this example, optical fibers can be oriented such that they ingress/egress in two different (opposite) directions.

FIG. 4D is a top, transparent view illustrating yet another example implementation, where a plurality of WSBs/WSB housings are stacked, including WSB 480/WSB housing 488. As illustrated in FIG. 4D, WSB 400 may include one or more waveguides, e.g., waveguide 480a, and optical cable connector sockets 486a and 486e. Optical cable connector sockets 486a and 486e are each configured to receive/connect to an optical fiber, in this example, optical fibers 492b and 496b, by way of optical cable connectors 492a and 496a, respectively, that opto-mechanically connect to optical cable connector sockets 486a and 486e, which in turn effectuates a connection to one or more waveguides, one of which may be, e.g., waveguide 480a. In contrast to previously described embodiments, where each of a WSB's optical cable connector sockets are angularly oriented in the same direction, in this embodiment, at least a first and a second optical cable connector sockets may have different orientations. In this case, optical cable connector sockets 486a and 486e of WSB 480 may be oriented in opposite directions, e.g., optical cable connector socket 486a may be angularly oriented to be right-facing, while optical cable connector socket 486e may be angularly oriented to be left-facing. In some embodiments (not illustrated), every other optical cable connector socket may be oriented in a different direction.

FIG. 5A illustrates an example of WSB/WSB housing stacking that can be achieved in accordance with one embodiment. In this example, a first WSB/WSB housing 500/508 may stacked on top of (or below or beside) another WSB/WSB housing 520/528. As alluded to above, WSB housings may comprise coupling/alignment features to allow stacking thereof. FIG. 5A illustrates one embodiment, where WSB housing may comprise a plurality of mounting features in the form of female mounting connectors 509a, 509b, and 509c. Each of female mounting connectors 509a, 509b, and 509c can mate with a corresponding male mounting connector, in this case male mounting connectors 529a, 529b, and 529c, respectively, of WSB housing 528. It should be understood that a variety of other coupling features/mechanisms can be utilized in accordance with other embodiments. For example, other coupling features may include, but are not limited to, e.g., coupling clips, coupling slots that matingly connect, or other retention mechanisms, such as straps that encompass and hold together, a stack.

In some embodiments, housing 528 may further comprise retention features, e.g., friction fit protrusions/bumps and corresponding recesses, magnets, glue pads, etc. An example of such a retention feature is labeled as 527 in FIG. 5A. In some embodiments, retention features may co-exist with the aforementioned coupling features. In some embodiments, such retention features may couple to a base or a printed circuit board (PCB) for example. In other embodiments, only the bottom-most and top-most housings of a WSB stack may have these retention features to secure the housings of the WSB stack to a base and top cover.

Stacking WSB/WSB housing 500/508 with WSB/WSB housing 520/528 can be effectuated by joining them (through an action illustrated by arrows 514/516). In this embodiment, optical cable ferrule interfaces, e.g., optical cable connector socket 506a, is oriented at an acute angle relative to the body/central portion of WSB 500, and is configured to accept an optical cable ferrule, e.g., optical cable connector 510a which terminates, e.g., a first end of optical cable 510b. A locking tab 510c, which can be, e.g., a depressable locking tab that interfaces with a portion(s) of optical cable connector socket 506a to removably lock optical cable connector 510a in place.

FIG. 5B is a perspective, transparent view illustrating a stack of WSBs/WSB housings 500/508, 520/528, 540/548, and so on. A first surface of each of WSB housings 508, 528, 548, and so on may include a first set of coupling features, while a second surface (in this case, opposite the first surface) of each of WSB housings 508, 528, 548, and so on may include a second set of coupling features that correspond to and effectuate stacking. It should be noted that not all WSB housings in a stack need to comprise the same type of coupling features. For example, a first WSB housing may comprise the aforementioned complimentary, e.g., male/female, coupling connectors, while a second WSB housing may not include any coupling connectors thereon. However, the first and second WSB housing may still be connected by way of, e.g., a strap or other retaining mechanism holding the first and second WSB housings together in a stacked fashion.

Figure 5C:
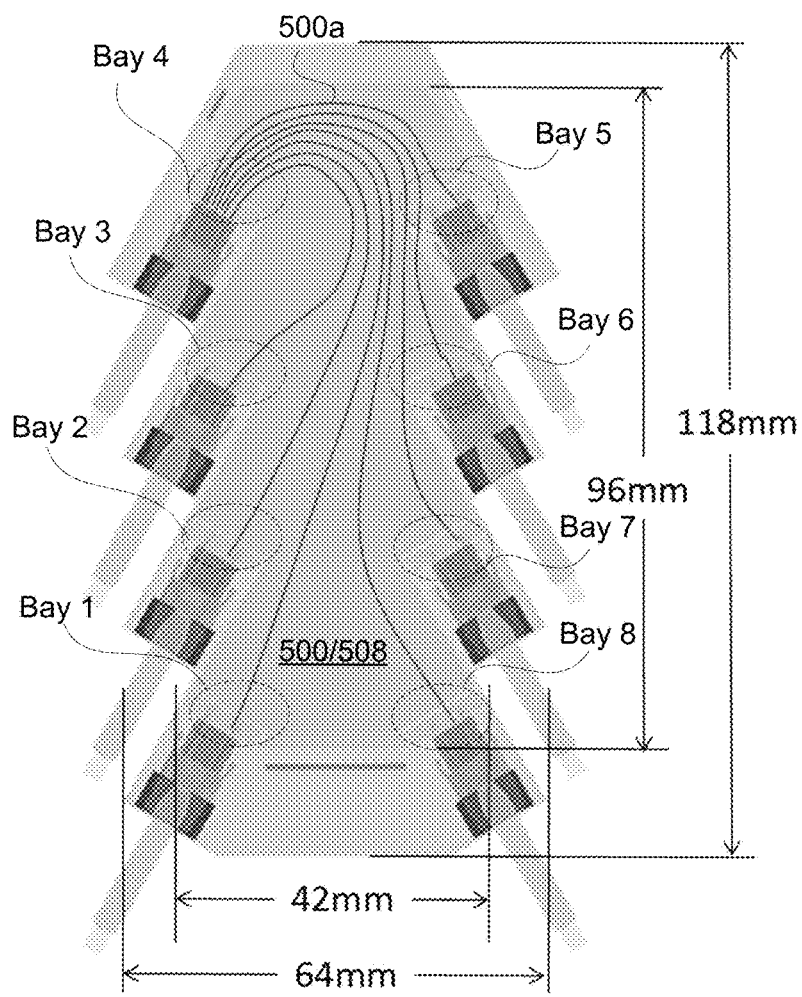
FIG. 5C illustrates a top, transparent view of an example waveguide shuffle block and internal waveguide routing according to some embodiments.
Figure 5D:
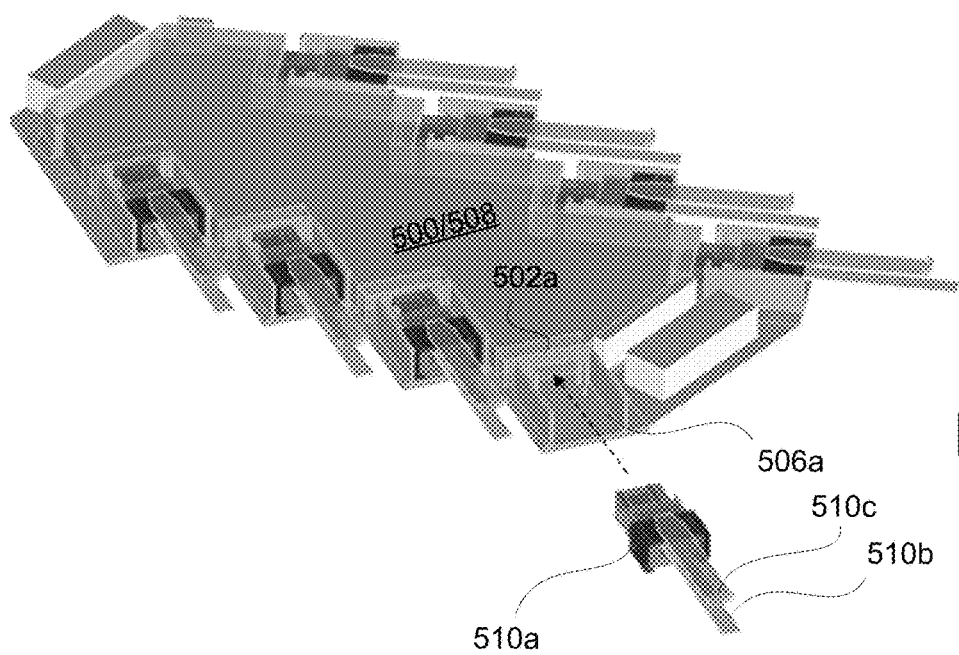
FIG. 5D illustrates optical connector attachment to an example waveguide shuffle block according to some embodiments.

FIG. 5C is a top, transparent view of WSB/WSB housing 500/508, and FIG. 5D is a perspective, transparent view of WSB/WSB housing 500/508. As illustrated in FIG. 5C, at or proximate to each of the optical cable connector sockets, one of which is optical cable connector socket 502a, is a receptacle or a receiving bay. Additionally, non-limiting example dimensions of WSB 500 comprise an overall length or 96 mm and overall width of 42 mm, while non-limiting example dimensions of WSB housing 508 comprise an overall length of 118 mm and an overall width of 64 mm. Moreover, illustrated in FIG. 5C are a plurality of the aforementioned waveguides, which in some embodiments, may be laser-written into a glass plate(s) making up WSB 500. One such waveguide, waveguide 500a is illustrated as connecting Bay 4 to Bay 5. Moreover, Bay 4 is illustrated as connecting to each of the other bays, Bays 1-3 and 5-8. As alluded to above, various embodiments can effectuate many-to-many connectivity, e.g., all-to-all connectivity, in which case, each one of Bays 1-8 may connect via waveguides to every one of the other Bays 1-8. It should be understood that the waveguides written into the glass plate(s) of WSB 500 can be routed in any desired pattern to achieve the requisite/desired connectivity. Other types of connectivity besides many-to-many or all-to-all connectivity can be realized as well, again with the desired waveguide routing between/amongst a desired subset(s) of bays. It should be noted that although various embodiments contemplated and described herein involve laser-written waveguides, WSBs can in other embodiments, utilize physical connections between bays, e.g., fiber connections. And, although embodiments described herein involve connectivity between WSBs and optical sources/sinks, in other embodiments WSBs can connect to other WSBs, e.g., using fiber connections therebetween.

It should be understood that a bay can refer to a socket or a receptacle to provide coarse alignment for the optical cable connector inserted, as well as finer alignment for the optical cable ferrule (in the optical cable connector) to be guided. An optical cable ferrule may have final alignment features on a first end to couple with the complementary alignment features in the optical cable ferrule interface disposed on a WSB/glass plate. The optical cable ferrule may have fibers terminated on the second end. An optical cable connector may also have fiber retention features and a cable booth to securely hold a cable jacket that encapsulates the optical fibers. A strength member such as aramid yarn is used to wrap around optical fibers before the cable jacket is applied around the strength member. Such a strength member allows optical cables to be strong enough to be pulled through raised floors and elevated cable trays in datacenters. A bay has retention features to hold the optical cable connector, where optical cable connector also has complementary retention features, such as latching tabs and push-pull sleeve to engage/disengage.

As illustrated in FIG. 5D, an optical cable connector, e.g., optical cable connector 510a, which encapsulates an optical fiber ferrule that in turn holds optical fibers within the optical cable 510b, can be connected to/removed from optical cable connector socket 506a. Moreover, in FIGS. 5A-5D, the optical connector examples are parallel-fiber type, e.g., MPO, that holds multiple fibers where these fibers may be used for all transmit fibers, all receive fibers, or a mix of transmit and receive fiber pairs (versus, e.g., full duplex fibers illustrated in FIGS. 4C-4D).

Figure 6A:
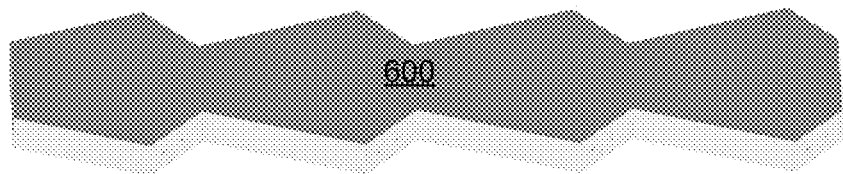
FIGS. 6A and 6B are perspective and side views, respectively of an example glass block of a waveguide shuffle block according to some embodiments.
Figure 6B:
Figure 6B:

FIG. 6A illustrates a top, perspective view of a WSB 600. FIG. 6B illustrates a side view of WSB 600 and a side of a WSB housing 608 which encases WSB 600. As described above a WSB, such as WSB 600 may comprise a glass block or plate(s) that provide optical cable ferrule interfaces and waveguides, which can be fiber waveguides, three-dimensional laser-written waveguides, etc. In this embodiment, WSB 600 is illustrated as having a non-limiting example thickness or depth of about 2 mm.

WSB housing 608 can provide optical cable ferrule alignment features as well as a corresponding optical cable connector socket for receiving and mating with optical cable connectors. Additionally still, WSB housing 608 may comprise WSB stacking/interlocking features, such as the male/female coupling features described above with reference to FIGS. 5A-5B. In this example, WSB housing 608 is illustrated as having a non-limiting, example thickness/depth of less than about 6 mm.

Figure 6C:
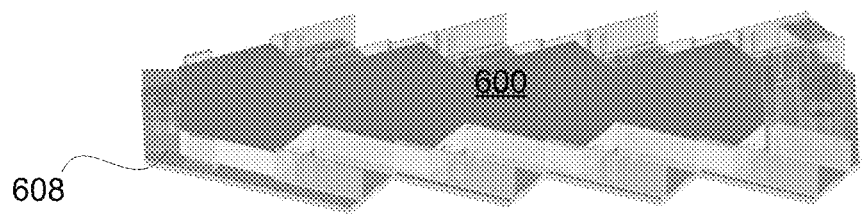
FIGS. 6C and 6D are perspective and side views, respectively of an example waveguide shuffle block according to some embodiments.
Figure 6D:
Figure 6E:
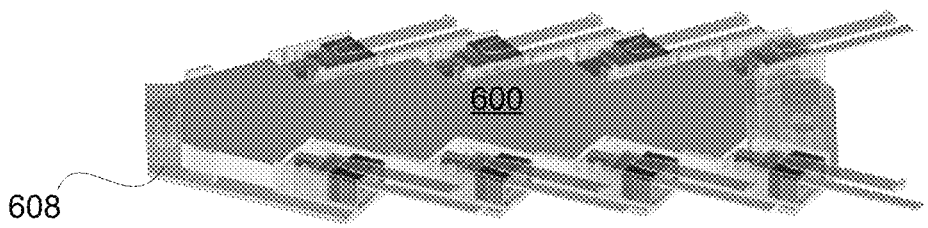
FIGS. 6E and 6F are perspective and side views, respectively of the example waveguide shuffle block of FIGS. 6C and 6D with connectors attached thereto.
Figure 6F:
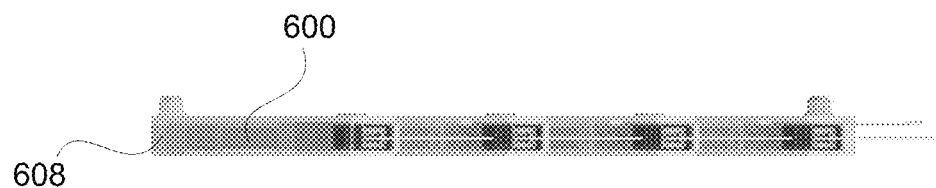

FIGS. 6C and 6D respectively illustrate a top, perspective view of WSB/WSB housing 600/608 and a side view of WSB/WSB housing 600608, and FIGS. 6E and 6F respectively illustrate a top, perspective view of WSB/WSB housing 600/608 and a side view of WSB/WSB housing 600608 with optical cable connectors mated thereto.

As alluded to above, according to some embodiments, tags may be used or associated with optical cable ferrules (and/or connectors) as well as with a WSB itself in order to facilitate sensing of various characteristics involving WSBs for, e.g., network connection topology detection, maintenance, etc. That is, through the use of tags, such as identification or ID tags, the connectivity between network elements, such as switches, effectuated by one or more WSBs can be detected and monitored, if desired. Further still, characteristics, e.g., operating characteristics, physical characteristics, or other information related to or associated with fibers, connectors, WSBs, or aspects thereof can be detected and/or monitored using such tags. Given the aforementioned use of WSBs to support complex and large network connectivity, various embodiments provide a mechanism(s) to gain operational insight these complex and large networks.

Figure 7A:
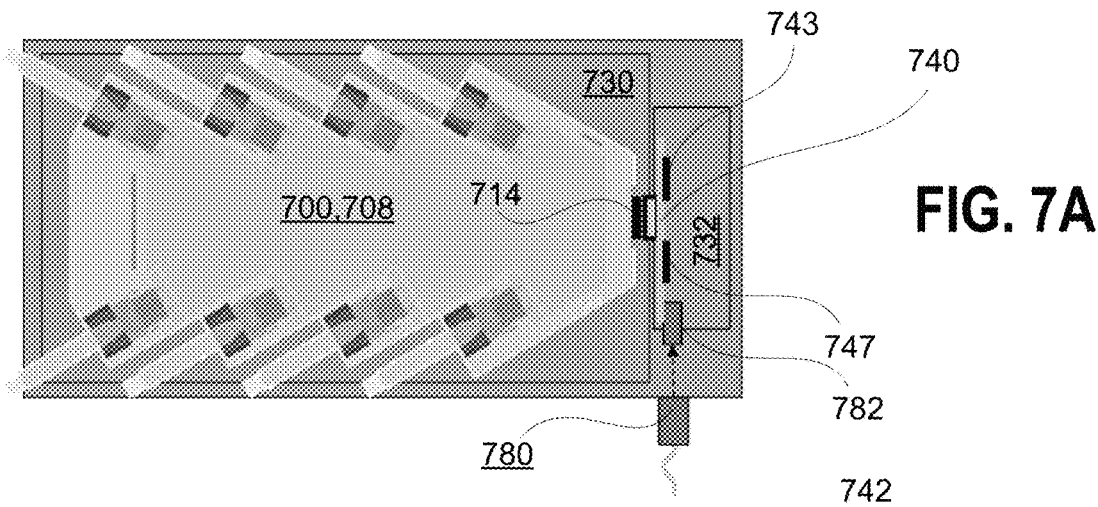
FIGS. 7A, 7B, and 7C are top, side, and rear views, respectively, of an example waveguide shuffle block stack sensing system according to some embodiments.
Figure 7B:
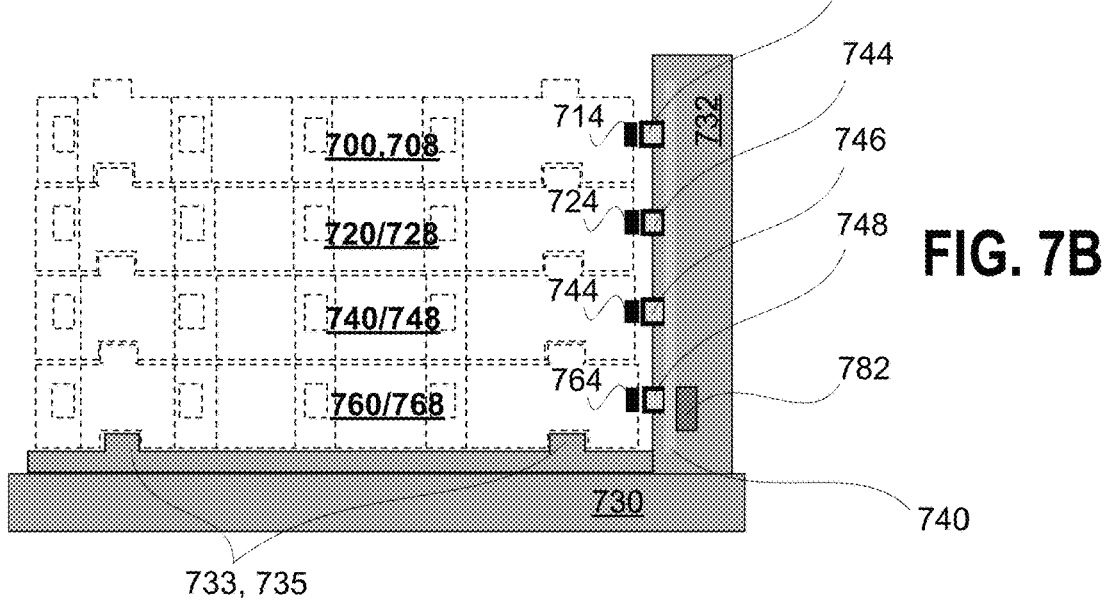
Figure 7C:
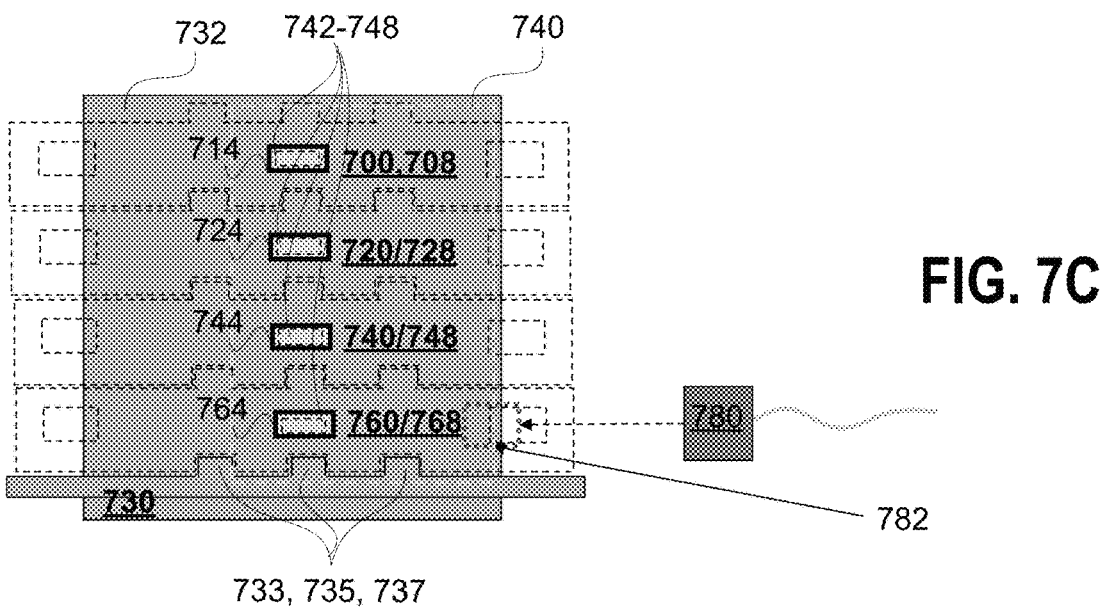

FIGS. 7A-7C illustrate top, side, and rear views, respectively, of a WSB stack sensing system. As illustrated in FIG. 7A, a top, transparent view of a WSB/WSB housing 700/708 is supported by a support structure that can comprise a support base 730 and support column 732 in which a tag reader assembly 740, which may be a circuit or logic board in some embodiments, may be implemented. As illustrated in FIGS. 7A-7C, the tag reader assembly 740 may include one or more tag reader antenna(e) 742, 744, 746, 748, each of which communicating with a corresponding tag of a WSB. In this example, tag reader antenna 742 may communicate with tag 714 of WSB 700, tag reader antenna 744 may communicate with tag 724 of WSB 720, tag reader antenna 746 may communicate with tag 744 of WSB 740, and tag reader antenna 748 may communicate with tag 764 of WSB 760.

It should be understood that any sensor or tag or similar mechanism may be used to record and/or obtain characteristics of a WSB and/or its components. For example, a sensor or tag may sense whether each of a WSB's optical cable connector socket is occupied by/connected to an optical cable connector, whether one or connected fibers are operational, a current data throughput of connected fibers, the existence of a WSB, the connectivity effectuated by a WSB, and so on. The sensor or tag may include its own processing capability to compute the results for information such as the aforementioned characteristics of the WSB that can be provided to tag reader assembly 740 and/or to another processor(s), data store(s), or other network entity/component that may be configured to receive such information via, e.g., a system power and management component 780 connected to a system power and management interface connector 782 on support column 732. System power and management component 780 may comprise tag reader functionality in conjunction with tag reader assembly 740, and manages WSB 700. System power and management component 780 may have additional functions, e.g., WSB installation date/time, sequence of events of specific optical connectors detected to be installed/uninstalled in WSB 700/708, and processing functions to generate a connection topology, and communicate them to, e.g., a tower controller.

The system power and management connector 782 on the WSB stack controller board 740 provides an interface to system power to operate the electronics on the WSB stack controller board 740, as well as provides an electronic signal interface for the WSB stack controller 743 to communicate with a system controller (not shown). In other examples, the WSB stack controller board 740 may also have a WiFi controller 747 for the WSB stack controller 743 to wirelessly communicate with a system management controller. In one example, a power over Ethernet (PoE) cable connection can be effectuated from system power and management connector 782 to a management network switch in a datacenter.

In other embodiments, one or more sensors may be data-gathering-only sensors that provide only raw data. In further embodiments, hybrid sensors may be included that provide a combination of raw data and processed data. It should be further understood that such sensors or tags, e.g., tags 714, 724, 744, and 764 may communicate wirelessly with a corresponding tag reader antenna 742, 744, 746, 748 using any wireless communication method or protocol known now or in the future, e.g., near field communications (NFC), RFID, some combination of wireless technologies, etc. In some embodiments, one or more tag reader antennae (depending on the wireless communication technology used) may be remotely located. In some embodiments a single antenna may be used to detect multiple tags, or instead of an antenna, another detection device or processor/data store for receiving tag-obtained or tag-generated information can be used. In other embodiments, tag reader antennae can be replaced with a wired connector, socket, port, or other physical wired mechanism over which a connection to a WSB tag can be effectuated.

As illustrated in FIGS. 7B and 7C, the coupling features discussed above can be used to stack WSBs/WSB housings. Similar coupling features, e.g., male interlocking or coupling connectors 733, 735, 737 may be used to connect base 730 to one of the stacked WSBs/WSB housings, in this example WSB/WSB housing 760/768. However, and as noted above, a stack of WSBs can be held together using other mechanisms, and the aforementioned coupling features of the base 730 are not necessarily required in accordance with other embodiments.

Figure 8A:
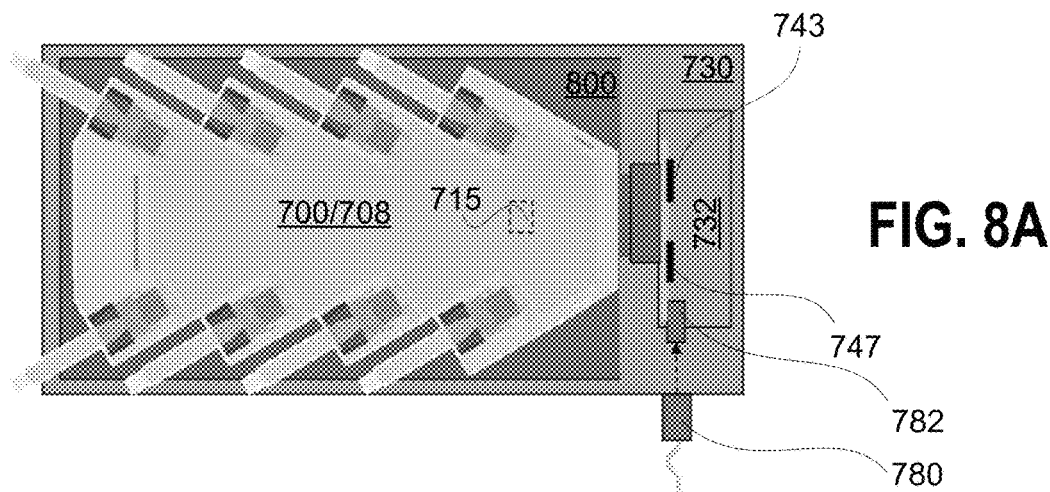
FIG. 8A is top view of an example waveguide shuffle block stack sensing system according to some embodiments.
Figure 8B:
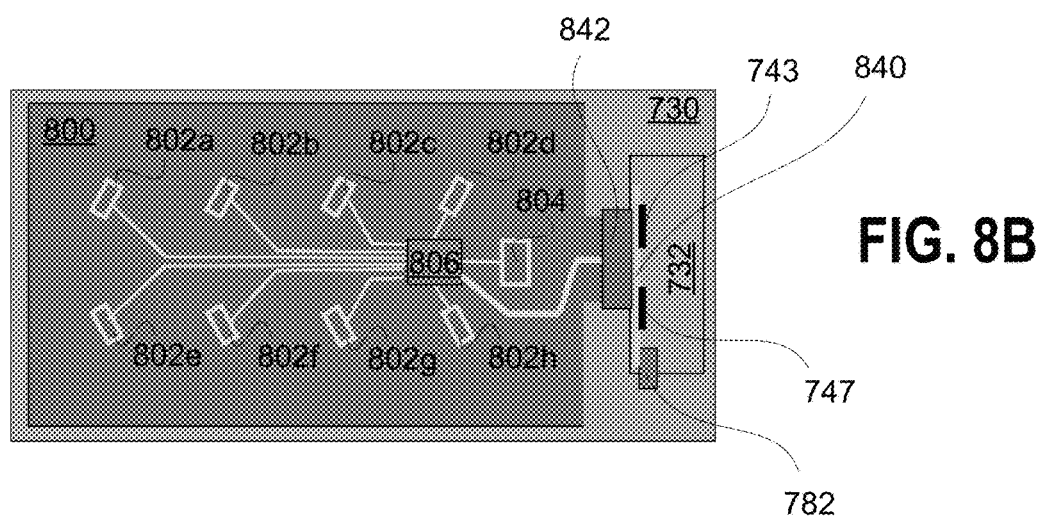
FIG. 8B is a top view of an example waveguide shuffle block management board of the example waveguide shuffle block stack sensing system of FIG. 8A.

FIG. 8A illustrates a top, transparent view of WSB/WSB housing 700/708. In this embodiment, WSB/WSB housing 700/708 may be operatively attached to a WSB management board 800, that in turn may be operatively connected to support column 730 on which a WSB stack controller board 840 may be implemented via a respective WSB stack connector 842. As illustrated in FIG. 8B, a WSB management board 800 may comprise logic and/or circuitry including, but not limited to optical connector tag reader antennae 802a-802h, each of which may communicate with an optical connector operatively connected to WSB 700. A WSB tag reader antenna 804 may also be included as part of WSB management board 800. The WSB tag reader antenna 804, in conjunction with optical connector tag reader antennae 802a-802h, can sense or detect the presence of a WSB and optical connectors attached to the WSB along with any associated information programmed onto or obtained/generated by a corresponding WSB tag 715 and corresponding optical connector tags implemented at each optical connector connected to WSB 700. In contrast to the embodiment illustrated in FIGS. 7A-7C and described above, each optical connector may have a corresponding tag as opposed to a singular tag per WSB. WSB controller 806 comprises tag reader functionality and communicates with WSB management board 800. WSB controller 806 may have additional functions, e.g., WSB installation date/time, sequence of events of specific optical connectors detected to be installed/uninstalled in WSB 700/708, and processing functions to generate a connection topology, and communicate them to a WSB stack controller 743.

Figure 8C:
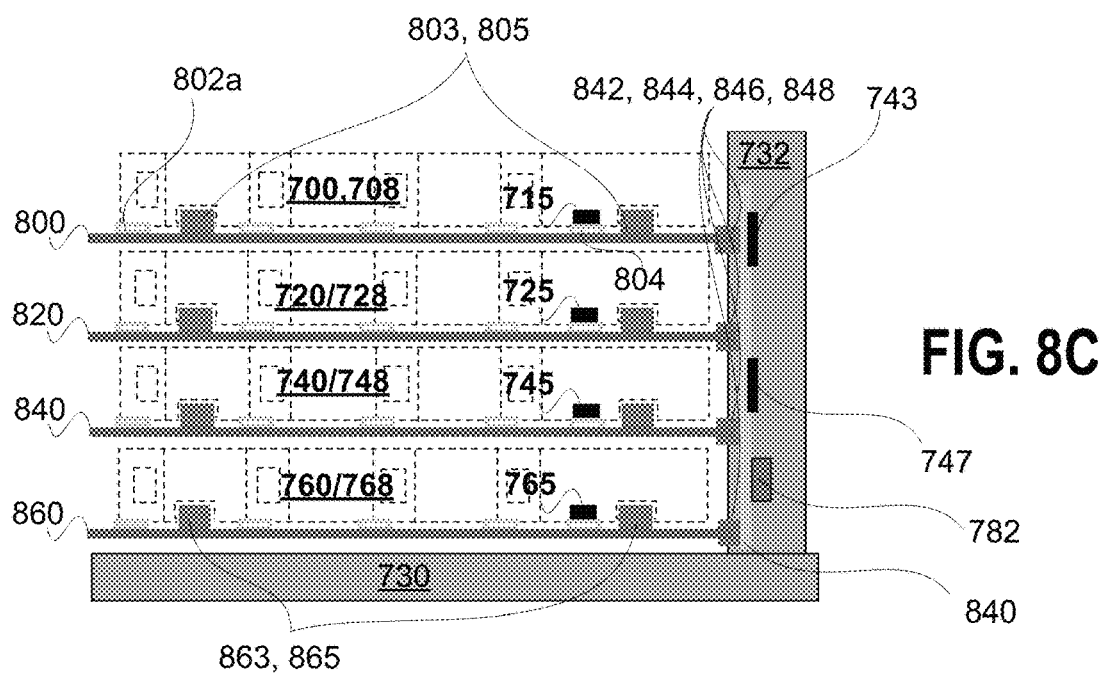
FIG. 8C is a side view of the example waveguide shuffle block stack sensing system of FIG. 8A.

As illustrated in FIG. 8C, a side view shows a stack of WSBs/WSB housings 700/708, 720/728, 740/748, 760/768 along with the respective WSB tags 715, 725, 745, 765. In this embodiment, because management boards 800, 820, 840, and 860 provide control/management/sensor or tag-reading functionality, each of WSBs/WSB housings 700/ 708, 720/728, 740/748, 760/768 can be coupled to management boards 800, 820, 840, and 860, respectively. In this embodiment, the female coupling connectors of each WSB housing 708, 728, 748, 768 may interlock or interconnect to corresponding male coupling connectors on each WSB management board. Example male coupling connectors 803, 805, and 863, 865 are illustrated in FIG. 8C. Each of the management boards, 800, 820, 840, and 860 can be operatively connected to support column 732 via respective WSB connectors 842, 844, 846, 848.

Figure 9A:
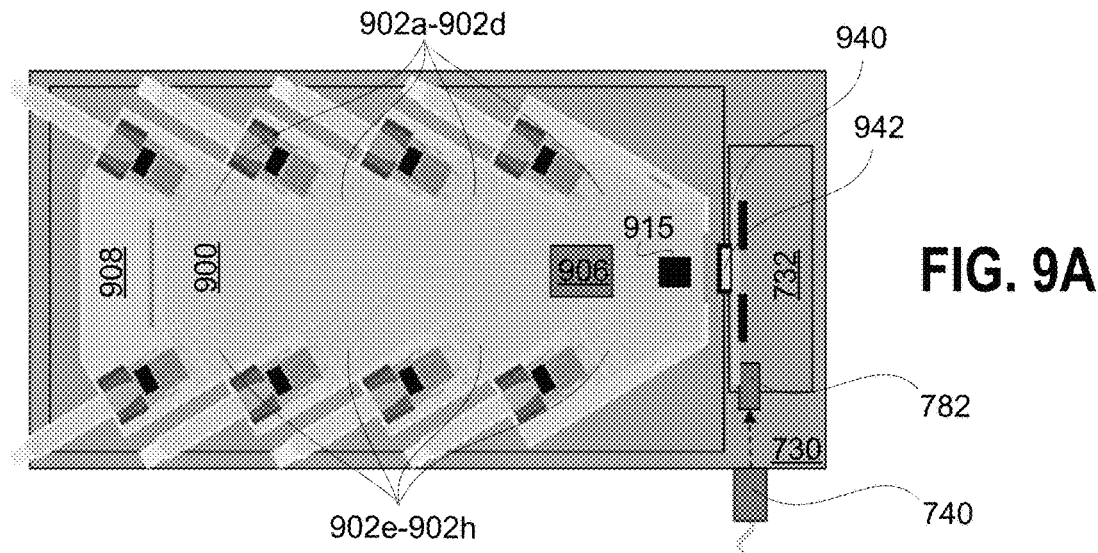
FIGS. 9A, 9B, and 9C are top, side, and rear views, respectively, of an example waveguide shuffle block stack sensing system according to some embodiments.
Figure 9B:
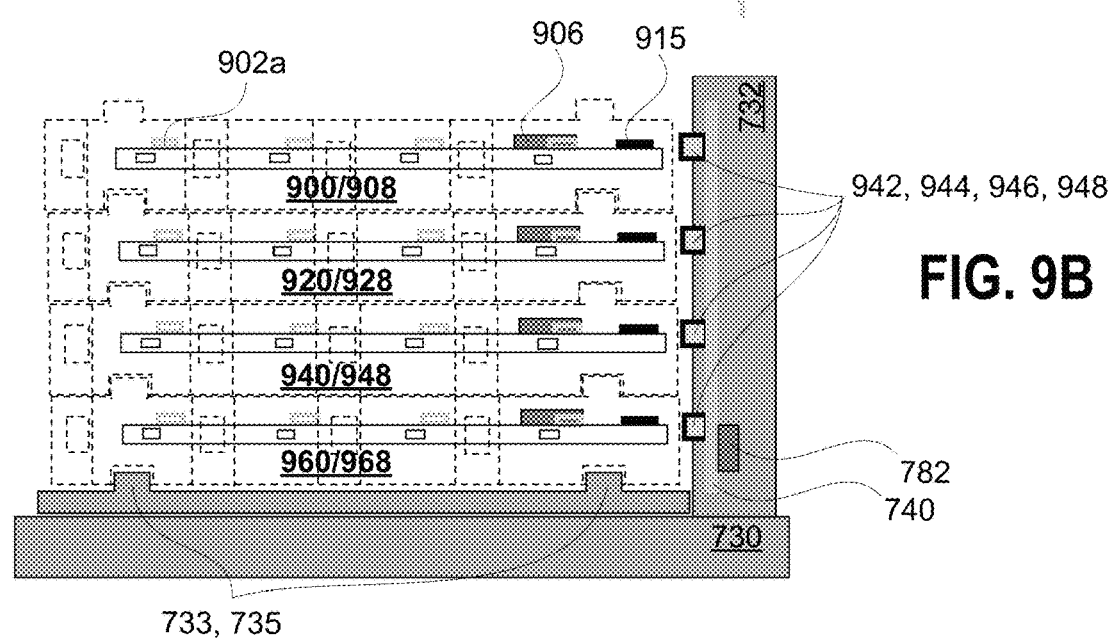
Figure 9C:
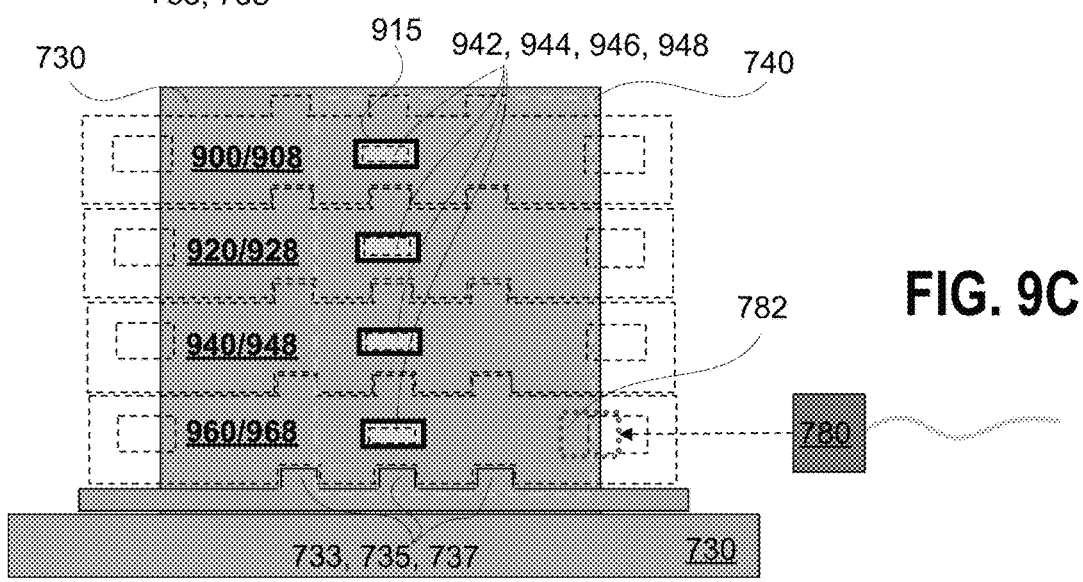

In accordance with still another embodiment, as illustrated in FIGS. 9A-9C and described below, ferrule/connector tag reader antennae, a WSB controller, and a WSB tag can be implemented on the glass plate(s)/block(s) making up a WSB instead of being implemented on a management board, e.g., management board 800. For example, FIG. 9A is a top, transparent view illustrating ferrule/connector tag reader antennae 902*a-h*, WSB controller 906, and WSB tag 915 that are all implemented on WSB 900 itself. As illustrated in the top and rear views, respectively, of FIGS. 9B and 9C, without management boards, WSBs/WSB housings 900/908, 920/928, 940/948, 960/968 can be stacked together directly as already discussed above. The stack of WSBs/ WSB housings 900/908, 920/928, 940/948, 960/968 can be coupled to base 730 via one or coupling connectors, e.g., male coupling connectors 733, 735, 737.

Figure 10A:
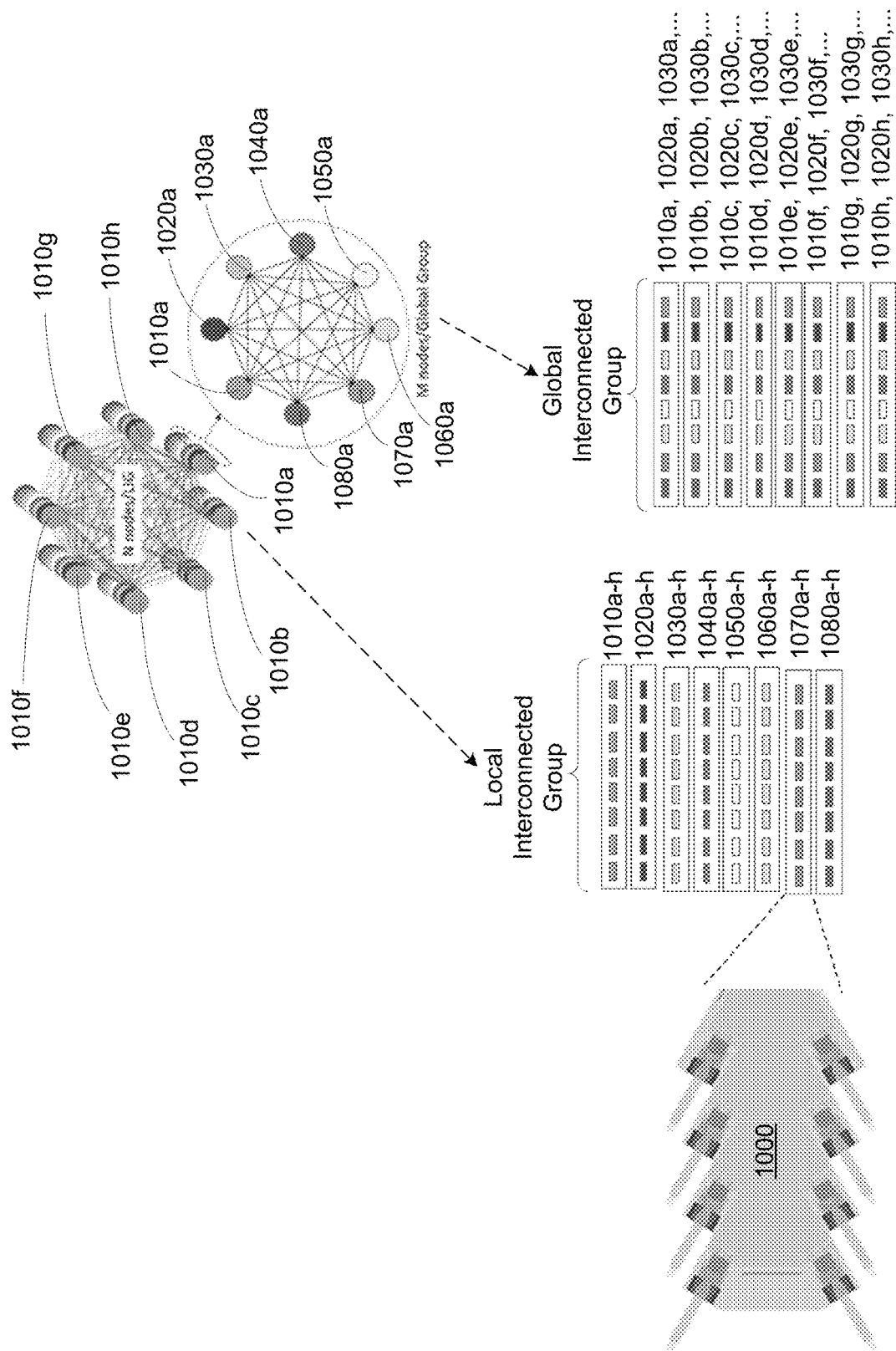
FIG. 10A is a schematic representation of all-to-all connectivity achieved using waveguide shuffle blocks according to some embodiments.

FIG. 10A is a schematic representation of an example all-to-all fabric, which may be an embodiment of the example fabric illustrated in FIG. 1. As illustrated in FIG. 10, multiple nodes (n=eight) may comprise a plurality of network layers (in this example, eight network layers). In an all-to-all connected network, each of the nodes n may be interconnected via a WSB stack, where one WSB (e.g., WSB 1000) effectuates connectivity between each node n of each of the eight network layers (local interconnected group connectivity), e.g., 1010*a-h*, 1020*a-h*, 1030*a-h*, 1040*a-h*, 1050*a-h*, 1060*a-h*, 1070*a-h*, 1080*a-h*. In one embodiment, each "line" connecting each local node of a layer may comprise a fiber pair. Thus, in a network layer comprising eight nodes, seven pairs of fiber connect each of the eight nodes to seven other nodes. To achieve all-to-all connectivity, each of the local nodes in each network layer connects to each other node of all the other network layers, referred to as global interconnected group connectivity, where there may be m nodes in an entire network across all network layers. Each "line" connecting a first subset of nodes spanning each network layer amounts to 7 fiber pairs. As illustrated in FIG. 10A, each of the global interconnected group includes eight groups (a first group including 1010*a*, 1020*a*, 1030*a* . . . ; a second group including 1010*b*, 1020*b*, 1030*b*, . . . ; a third group 1010*d*, 1020*d*, 1030*d*, . . . , and so on).

Figure 10B:
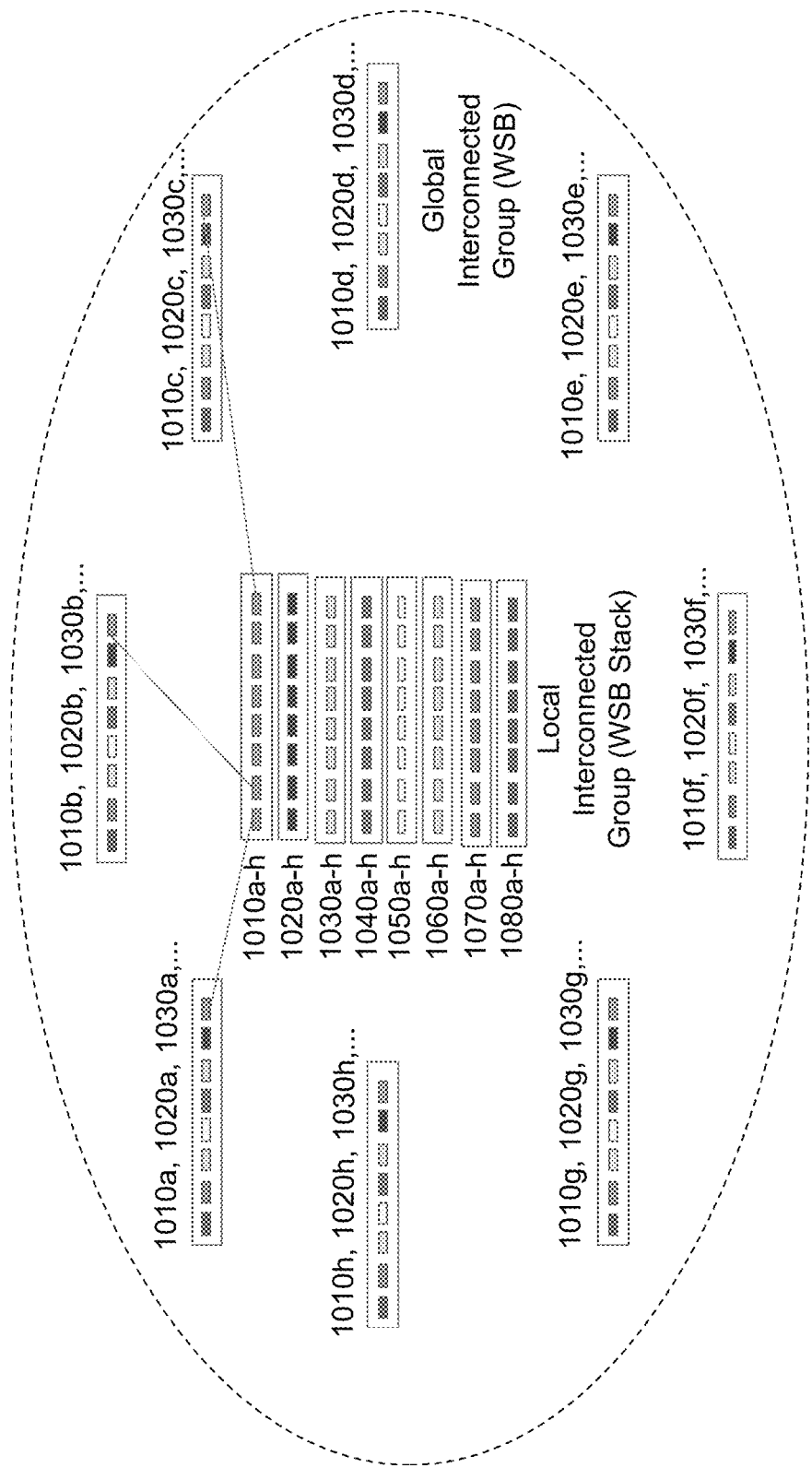
FIG. 10B is another schematic representation of all-to-all connectivity achieved using waveguide shuffle blocks according to some embodiments.

FIG. 10B is another schematic representation of connectivity of the example all-to-all fabric of FIG. 10A. FIG. 10B illustrates the local interconnected group connectivity effectuated by a WSB stack, where each WSB of the WSB stack effectuates connectivity between each node in a local interconnected group (in this example, a network layer as discussed above), and between each node to each other node of every other network layer in the global interconnected group. It should be understood that to achieve all-to-all connectivity as illustrated, any number of WSB stacks may be used as appropriate. In this example, two WSB stacks are contemplated, e.g., one for the local interconnected group and another for the global interconnected group.

WSBs or WSB systems/assemblies can be stacked to provide high-density fiber connectivity, e.g., within a 1U box or in rack-plenums. WSB glass plates/blocks can be scaled to support varying numbers of ferrules and various waveguide connection topologies, and can be manufactured and tested at wafer scale or panel scale using automated machinery. Additionally, through the use of WSBs/WSB systems/assemblies disclosed herein, complex network connectivity can be discovered.

As alluded to above, some embodiments implement wavelength shifting in WSBs to effectuate a WSS. That is, silicon photonics technology may allow, e.g., a large number of wavelengths to be used to modulate electrical signals and be transportable in a single fiber. However, not all optical wavelengths necessarily need to go from a set of transmitters in a first system to a set of receivers in another system. Accordingly, in some embodiments WSBs can be implemented with PICs (photonics integrated circuits) to achieve wavelength shifting. A PIC (which includes wavelength couplers) may be coupled to a base surface/substrate such as glass, (having optical connector interfaces and waveguides as discussed above) where both the PIC and base glass plate comprise complimentary opto-electro-mechanical coupling features. Instead of waveguides connecting interface structures, a waveguide may couple an optical fiber connector to a waveguide coupler that redirects optical signals to allow coupling to a PIC. In this way, further shuffle functionality and/or routing path configurability can be achieved, where different PICs (having different configurations, e.g., number of couplers, number/path(s) of in-PIC waveguides, etc.) can be installed on a WSB to achieve different paths/routes for optical signals to pass/traverse to add to the existing configurability/functionality of WSBs/stackable WSBs as already discussed above. In some embodiments, PICs may be reconfigured to achieve or change a particular optical path(s). Moreover, WSSs like WSBs may include or work in conjunction with tags or other identification mechanisms as already described above.

Figure 11:
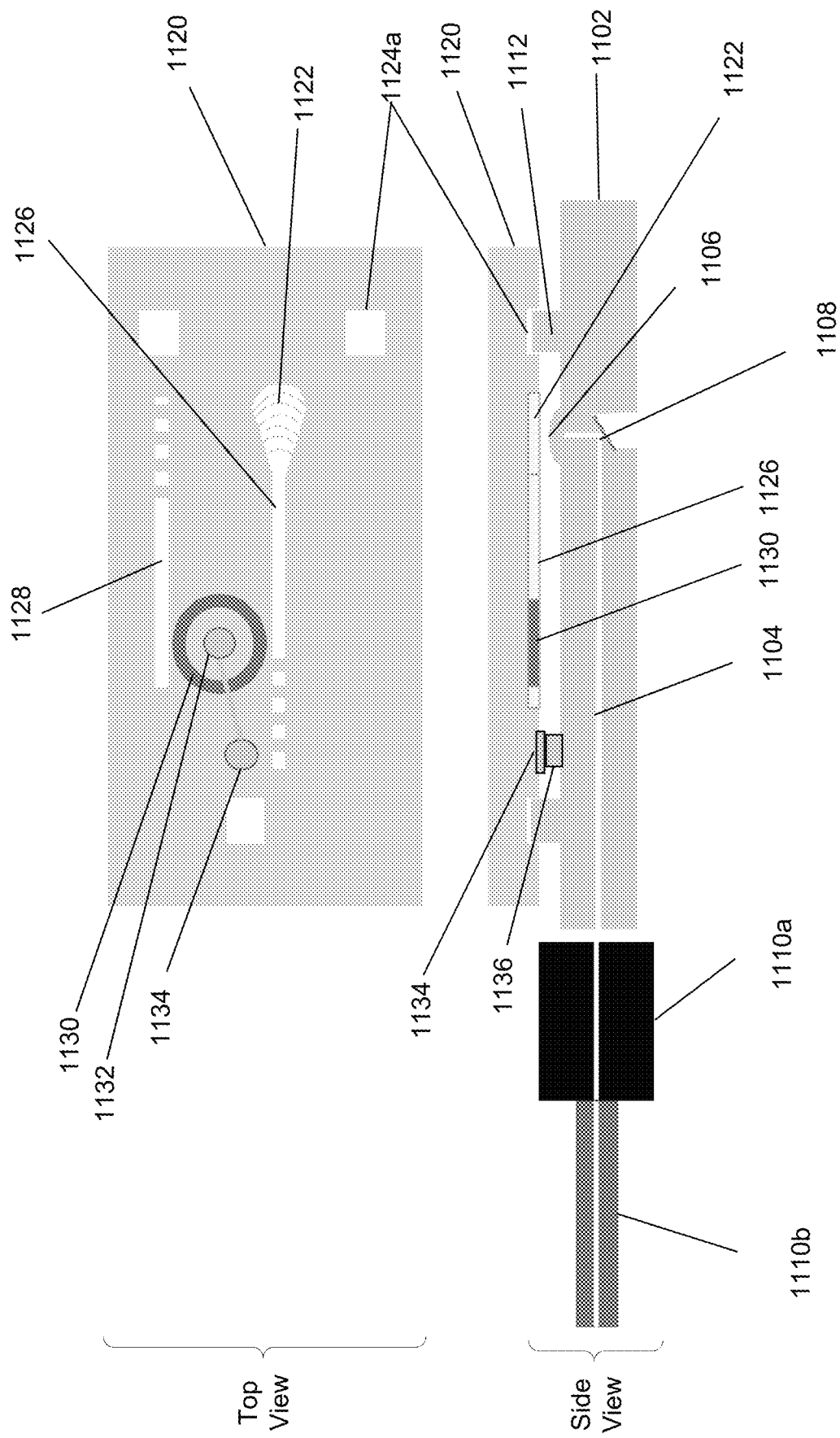
FIG. 11 is a top/side view of a photonic integrated circuit installed on a shuffle base according to some embodiments.

FIG. 11 illustrates a top view and a side view of an example PIC interfacing to a WSS base, e.g., glass plate, similar to a WSB glass base. FIG. 11 shows a PIC 1100 disposed atop WSS base 1102. Similar to the WSB housings described above, a PIC, such as PIC 1100 may include one or more alignment features, such as depression 1124*a* in which a corresponding base alignment feature, e.g., a protrusion 1112, fits to ensure proper alignment of a PIC to a base, e.g., so that electrical contacts, waveguide couplers, lenses, etc. will be aligned as appropriate. As previously described, glass plate may have one or more waveguides therein, e.g., 3D laser written waveguides through which optical signals may be routed. An example of one such waveguide 1104 is shown in FIG. 11, along with an example optical cable connector 1110*a* and optical fiber 1110*b*. As described above, some waveguides may have a corresponding lens or lens structure 1106 used for alignment of fibers. Waveguide 1104 in this example may also have a light-turn feature 1108, e.g., a reflective surface, that can be used, e.g., in a thinner glass base or for bending a waveguide in thicker glass.

FIG. 11 further illustrates a grating coupler 1122 (also referred to as a grating waveguide structure) to effectuate guided-mode or waveguide-mode resonance in order to diffract light signals in a particular direction. In this example, grating coupler 1122 comprises periodic etch structures to achieve the desired diffraction. Grating coupler 1122 may be operatively connected to/terminate a coupling waveguide 1126. Grating coupler 1122 allows optical signals received from optical fiber 1110a via waveguide 1104 to be redirected to PIC 1100. PIC 1100 may further comprise a wavelength coupler, which in this example, may be a micro-ring resonator (MRR) 1130. MRR 1130 may include micro-ring electrodes 1132 with which an electrical connection to a PIC interface contact 1136 can be made via a base glass interface contact 1134. In one example, an electronic circuit on a WSS base 1102 may control the micro-ring electrodes 1132 via the PIC interface contact 1136. In another example, an electronic circuit that controls the micro-ring electrodes 1132 may be disposed on the same PIC 1100.

Figure 12A:
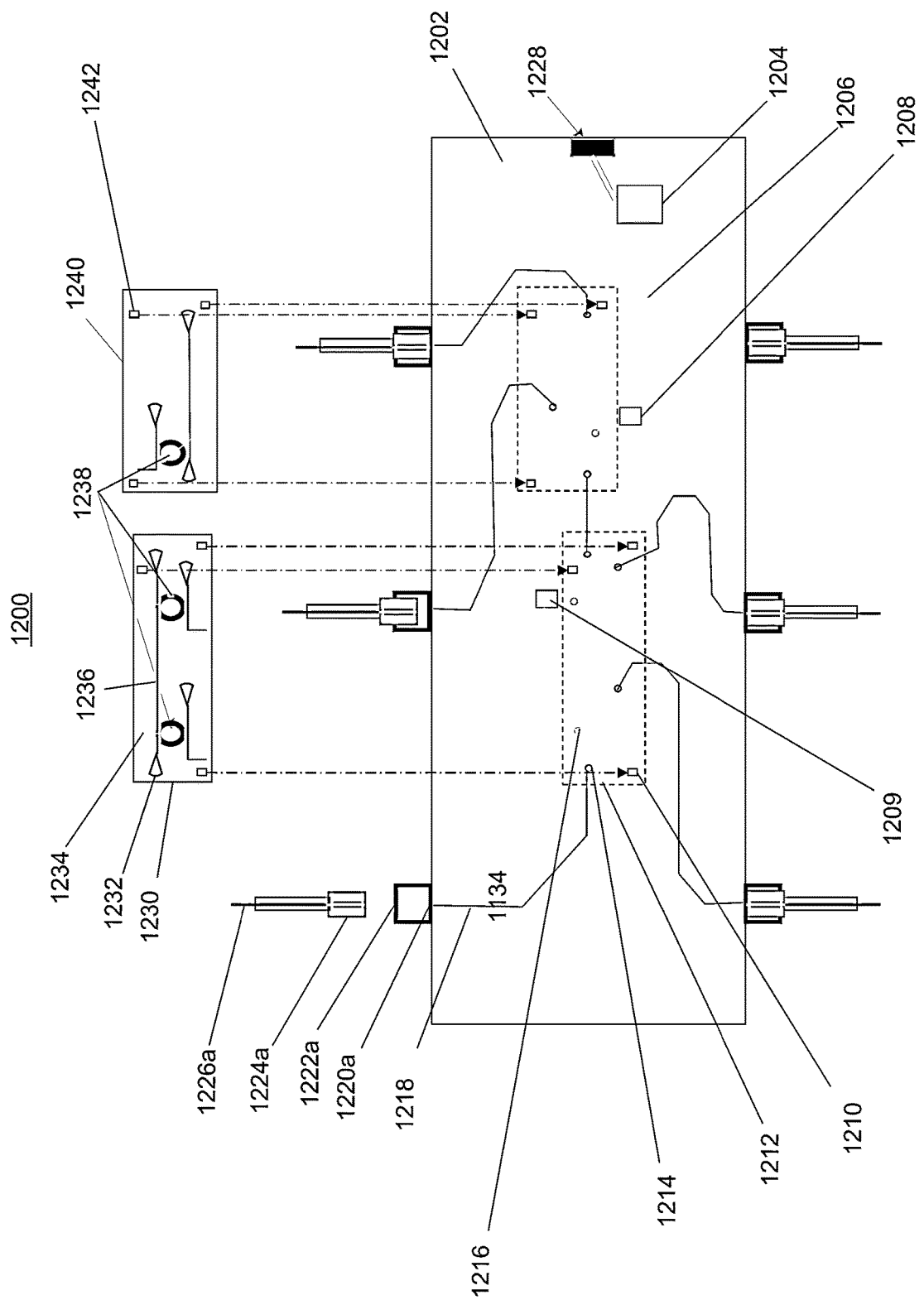
FIG. 12A is a top view of example photonic integrated circuits to be installed on a shuffle base according to some embodiments.
Figure 12B:
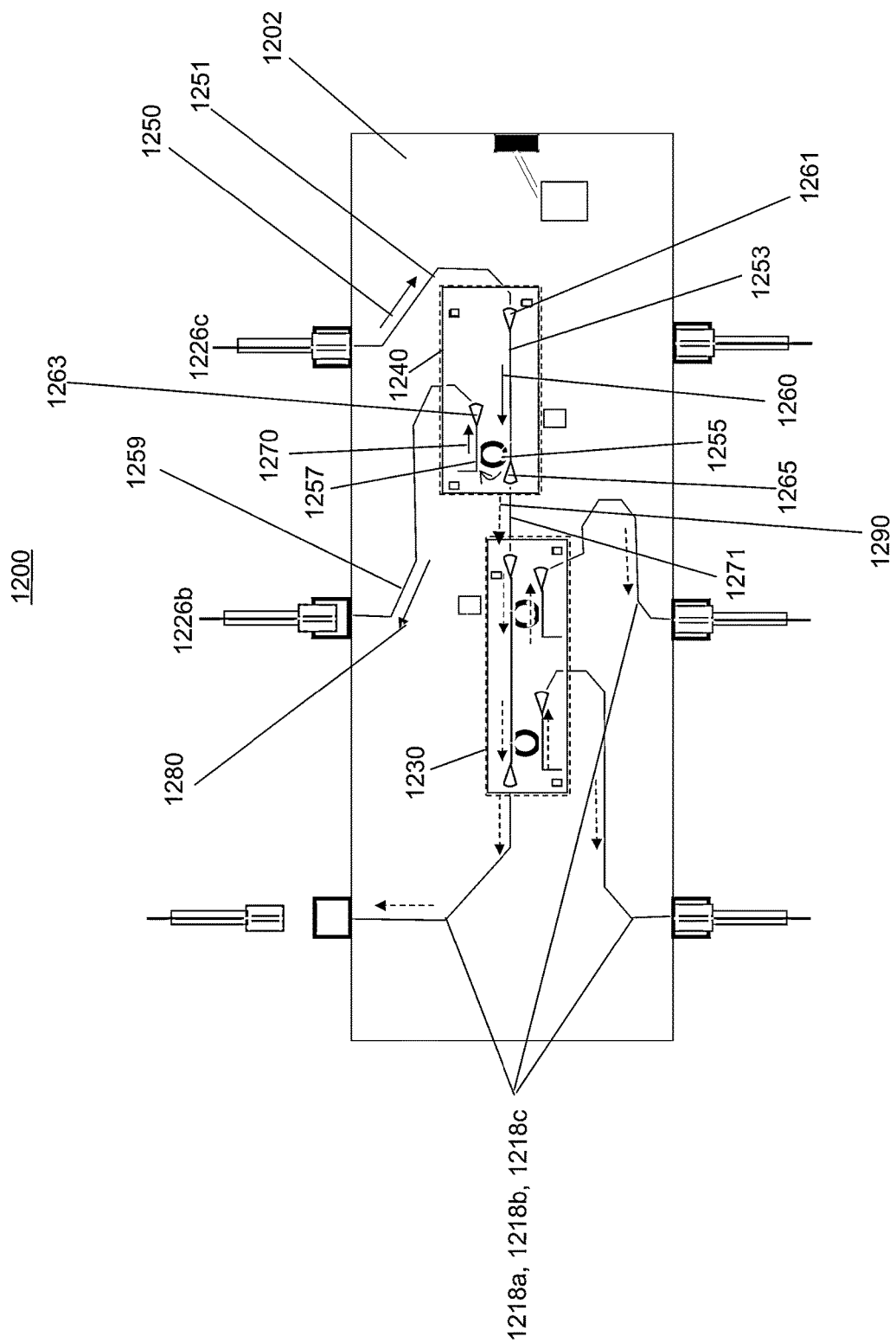
FIG. 12B is a top view of the example photonic integrated circuits installed on the shuffle base of FIG. 12A.

FIGS. 12A and 12B illustrate views of an example WSS 1200 which include two PICs, PIC 1230 and PIC 1240 installed onto a WSB base 1202, which may be a glass plate. As illustrated in FIG. 12A, WSS base 1202 may have incorporated thereon, a controller chip 1204, which, similar to WSB 806 (FIG. 8), may control operation of the WSS. WSS base 1202 may further comprise electrical control and data signal traces, an example of which is trace 1206. Control circuitry/chips, such as ring control chip 1208 may be implemented on WSS base 1202 and may control a PIC to which it is interfacing, which in this example is PIC 1240. As previously discussed, PICs and WSS bases may have alignment features, some examples of which are labeled 1210 and 1242. It should be understood that alignment of a PIC to a WSS base can be passive (described above) or active (e.g., using an optical alignment signal to determine whether the PIC is aligned to the WSS base, after which, the PIC can be fixed in that place/position). In an example, alignment features 1210, 1242 may be fiducials to assist vision alignment systems to install PICs 1230, 1240 precisely onto WSS base 1202, where the PICs may be secured permanently, e.g., by epoxy.

WSS base 1202 may further comprise a structural PIC interface 1212, such as a precision-formed mechanical recess to accept a PIC. In some examples, structural PIC interface 1212 may accept PICs 1230, 1240 exactly without other alignment features. In other examples, each structural PIC interface 1212 may have slightly large dimension than a PIC that will be accepting, and alignment features may be used. For example, alignment features 1210, 1242 may be solder balls disposed on WSS base 1202 that may have reference dimensions with respect to structural PIC interface 1212, in order for PICs 1230, 1240 to be installed with self-alignment mechanism such as by the tension force of solder balls 1210 pulling a PIC 1230 against two adjacent walls (forming a right angle corner) of structural PIC interface 1212.

As described above with respect to FIG. 11, WSS base 1202 may comprise an optical lens structure 1214 to allow the grating coupler 1232 of a PIC to interface with waveguides of WSS base 1202, an example of waveguide being waveguide 1218. Electrical contacts, an example of which is labeled 1216, allow electrical coupling of a PIC, in this case, PIC 1230 to a WSS base, in this case, WSS base 1202. Such an electrical connection can be used to effectuate control of a PIC via, e.g., ring control chip 1209.

Similar to above-described embodiments, WSS 1200 may include an optical cable connector structure 1220a and optical cable connector alignment housing 1222a for accepting an optical cable connector 1224a and the optical fibers therein, e.g., optical fiber 1226a. In this embodiment, PIC 1230 is illustrated as comprising a plurality of grating couplers, one of which is labeled as 1232. Also illustrated are example micro-ring contacts that allow micro-rings 1238 to interface with/to be controlled by a ring control chip(s) 1208, 1209. Further illustrated in FIG. 12A is an example of an in-PIC waveguide 1236 through which optical signals (that have been redirected from a waveguide of WSS base 1202) may travel. System interface connector 1228 used to connect WSS 1200 to, e.g., a support column (similar to support column 732 as shown in FIG. 7).

FIG. 12B illustrates example paths or routes through which an optical signal may travel within WSS 1200. As illustrated in FIG. 12B, an optical fiber 1226c may be a "source" fiber from which an optical signal 1250 enters WSS waveguide 1251 in WSS base 1202. Through the use of an aforementioned light-turn feature (not shown), optical signal 1250 traveling in WSS waveguide 1251 may be redirected and coupled into PIC 1240 via waveguide coupler 1261, and may became optical signal 1260 in PIC waveguide 1253 in PIC 1240. The filter 1255 on PIC 1240 may be configured to be resonant to the wavelength of optical signal 1260, and coupling (or dropping) the optical signal 1260 from PIC waveguide 1253 onto PIC waveguide 1257 as optical signal 1270. Filter 1255 may be a micro-ring resonator where its electrodes may be controlled by electronic circuits for the filter 1255 to be resonant to the wavelength of optical signal 1260. Optical signal 1270 is then coupled into WSS 1202 from PIC 1240 via waveguide coupler 1263 as optical signal 1280. Optical signal 1280 goes through a light-turn feature in WSS waveguide 1259, and is coupled to "destination" fiber 1226b. As an alternate example, when the filter 1255 is not tuned to the wavelength of the optical signal 1260, optical signal 1260 may couple to waveguide coupler 1265 instead, and continue as optical signal 1290 in WSS waveguide 1271 towards PIC 1230. Here, example path started in WSS waveguide 1251 takes an optical signal from source fiber 1226c to a "destination" fiber 1226b that is coupled to WSS waveguide 1259. Other possible signal paths may be routed to WSS waveguides 1218a, 1218b, or 1218c to couple to other corresponding destination fibers.

As noted above, a WSS, such as WSS 1200 may route particular wavelengths. In some embodiments, filters such as the micro-ring resonators (MRR) utilized in the example embodiment illustrated in FIGS. 12A and 12B, may be configured or tuned to a particular wavelength of optical signal. In other example embodiments, a mesh network of Mach-Zehnder Interferometers (MZI) may be used where phase tuning mechanisms for routing wavelengths to different waveguides will be similar to ring resonator filters. A difference may be that the MZI filters may allow for dynamic programming of various filter shapes, which may be beneficial for wavelength registration, fabrication imperfections, and temperature effects. In yet other examples, arrayed waveguide grating (AWGR) may be used to route wavelengths to different waveguides. In addition, PIC may be silicon-based or glass-based. Those of ordinary skill in the art would understand how to configure or tune MRR, MZI or AWGR components on silicon or glass.

Figure 13:
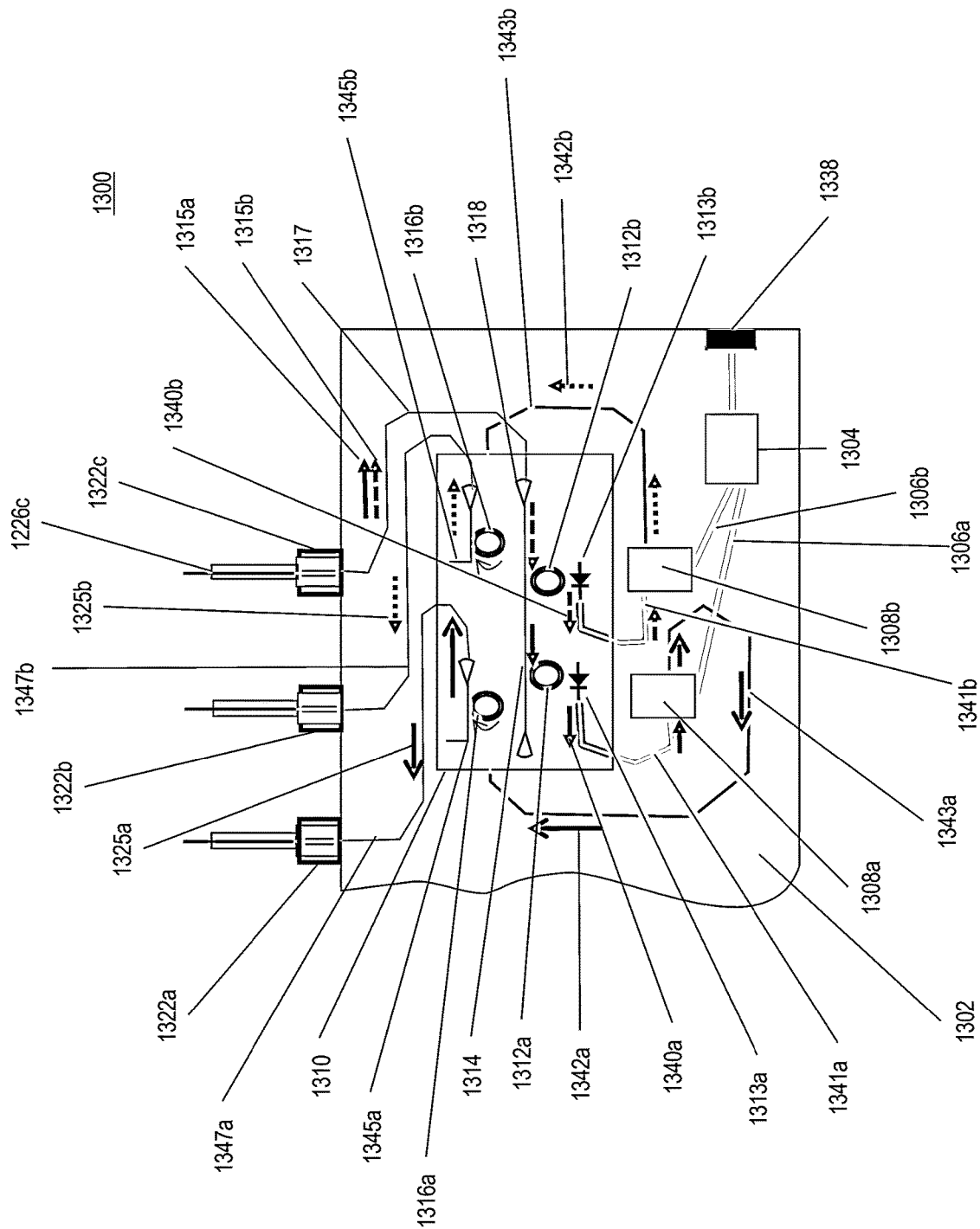
FIG. 13 is a top view of an example photonic integrated circuit and corresponding electrical/optical circuitry on the shuffle base.

In embodiments described above, an optical signal having a particular wavelength may be "dropped" and routed as desired, where that routed wavelength remains constant as it traverses a PIC(s) and WSS(s). In other embodiments, the wavelength of an optical signal can be altered. FIG. 13 illustrates a partial view of another WSS 1300 that can shift or convert the wavelength of an optical signal to another wavelength. This can be useful in scenarios, where there may be a single transmitter port of a system generating, e.g., four wavelengths, connected to a receiver port of each of four other systems that have the same design, i.e., each system's receiver port expects to receive the same wavelength. In this way, such a PIC can support the use of a single fiber carrying multi-wavelength optical signals to connect to multiple receivers that are tuned to receive one wavelength. For example, in a network switching context, modern high-radix switches (e.g., 256 ports) have large number of ports but small physical size switches (e.g., 1U) are designed. To keep switch physical size down, the number of optical cable connectors must typically be limited. One common method is to use wavelength division multiplexing (WDM) method where multiple wavelengths are used on a fiber, e.g., a 2-fiber duplex connector may be used to interface four ports of a switch to a transmit fiber and a receive fiber by using four wavelengths, i.e., each wavelength carrying signals of a port. Switch-to-switch connection may require high enough bandwidth that a point-to-point connection with a duplex fiber cable carrying an aggregate four ports as one larger port save significant amount of fibers in cables. However, when a switch port is connected to a server port, a 4-port aggregated in an optical fiber cannot be readily dispersed to four different servers. Even four different wavelengths on a fiber can be separated, using WSS methods, server ports having the same design cannot receive different wavelengths. By using a WSS such as WSS 1300, multiple wavelengths carried on a single fiber of an optical fiber can be routed to different optical fibers, each having the same wavelength. Thus, a single duplex fiber cable/connector carrying four wavelengths (in this example) on a switch can be used to communicate with four different servers, each receiving the same wavelength over a separate duplex fiber cable/connector via WSS 1300, resulting in fewer connectors on switch faceplate, which can result in cost savings.

FIG. 13 illustrates an example where incoming (WDM) optical signals 1315a, 1315b received via a fiber 1226c terminating at one source optical cable connector 1322c, are routed ultimately to two destination optical cable connectors 1322a and 1322b, as outgoing optical (single-wavelength) signals 1325a, 1325b, respectively. The outgoing optical signals 1325a, 1325b may be regenerated optical signals. Similar to previously-discussed examples, optical signals, such as incoming optical signals 1315a, 1315b may be redirected from a waveguide 1317 on WSS base 1302 to PIC 1310. Incoming optical signals 1315a, 1315b may be routed to a grating coupler 1318 and then to PIC waveguide 1314 on PIC 1310. Filter 1312a, 1312b are configured to be resonant at the corresponding wavelengths of optical signals 1315a, 1315b. Filter 1312a coupled optical signal 1315a and the photodetector 1313a associated to filter 1312a converts optical signal 1315a to electrical signal 1341a on electrical trace 1341a. It should be noted that electrical trace 1341a on PIC 1310 may transition to electrical trace 1341a on WSS base 1302 via an electrical interface as mentioned before. Electrical signal 1340a may then be received by integrated circuit (IC) 1308a (e.g., transimpedance amplifier) where IC 1308a amplifies, conditions and produces electrical signal 1342a over electrical trace 1343a on WSS base 1302. Electrical signal 1342a then couples onto electrical trace 1343a on PIC 1310 where it is converted to outgoing optical signal 1325a on PIC waveguide 1347a by modulator 1316a. Modulator 1316a may be a MRR. The regenerated outgoing optical signal 1325a may have a different wavelength than its original incoming optical signal 1315a. Finally, outgoing optical signal 1325a is coupled to destination optical cable connector 1322a.

Similarly, filter 1312b couples optical signal 1315b and the photodetector 1313b associated to filter 1312b converts optical signal 1315b to electrical signal 1341b on electrical trace 1341b. It should be noted that electrical trace 1341b on PIC 1310 may transition to electrical trace 1341b on WSS base 1302 via an electrical interface as mentioned before. Electrical signal 1340b may then be received by integrated circuit (IC) 1308b (e.g., transimpedance amplifier) where IC 1308b amplifies, conditions and produces electrical signal 1342b over electrical trace 1343b on WSS base 1302. Electrical signal 1342b then couples onto electrical trace 1343b on PIC 1310 where it is converted to outgoing optical signal 1325b on PIC waveguide 1347b by modulator 1316b. Modulator 1316b may be a micro-ring resonator (previously described). The regenerated outgoing optical signal 1325b may have a different wavelength than its original incoming optical signal 1315b. Finally, outgoing optical signal 1325b is coupled to destination optical cable connector 1322b. Outgoing optical signal 1325a and 1325b may have the same wavelength. Similar to other embodiments described herein, a system interface connector 1338 may be used to connect WSS 1300 to, e.g., a support column (similar to support column 732 as shown in FIG. 7).

Figure 14A:
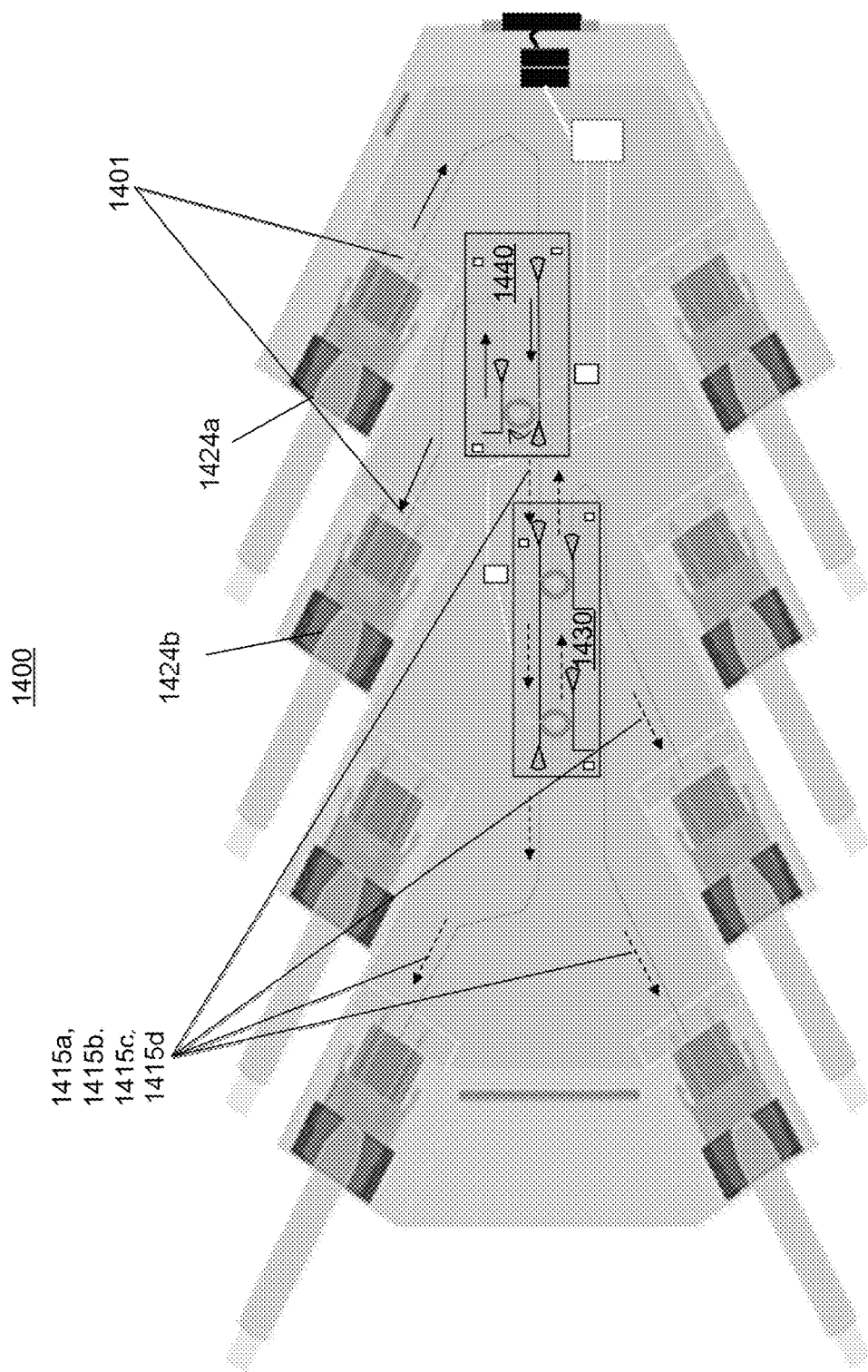
FIG. 14A is a top view of an example wavelength-shifting shuffle according to some embodiments.

FIG. 14A illustrates another embodiment of a WSS 1400 having a WSS base 1402 and housing 1408 (similar to previously described embodiments of a WSB). Installed on WSS base 1402 are PICs 1430 and 1440 through which optical signals from a source optical cable connector 1424a to a destination optical cable connector 1424b. In this example, an optical signal from source optical cable connector 1424a is routed to PIC 1440 and is output to destination optical cable connector 1424b, where 1401 reflects the path of an optical signal having a particular wavelength as it is rerouted from source optical cable connector 1424a to destination optical cable connector 1424b. Optical signal paths 1415a, 1415b, 1415c, and 1415d are other paths that an optical signal origination from source optical cable connector 1424a may traverse.

Figure 14B:
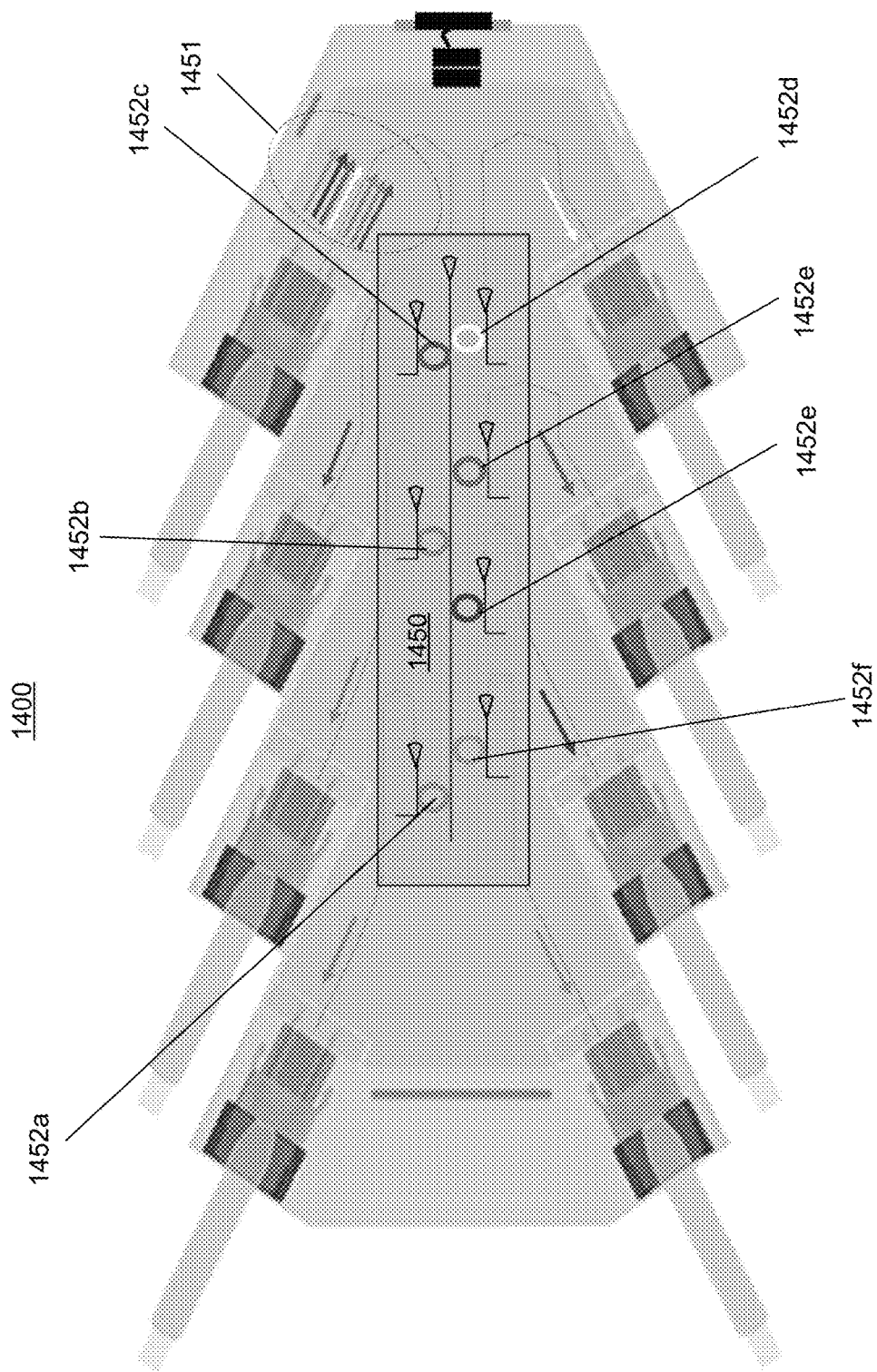
FIG. 14B is a top view of an example wavelength-shifting shuffle according to some embodiments.

FIG. 14B illustrates yet another embodiment of a WSS 1400 that in this example, has a single PIC 1450 on which seven micro-ring resonator filters 1452a-f are implemented. An optical cable connector may comprise one or more optical fibers, where each fiber carrying a set of wavelengths 1451. Each wavelength of the wavelength set 1451 may be resonant to and thus coupled by a particular micro-ring resonator, and may be dropped onto corresponding waveguides and to be coupled to respective optical cable connectors.

Figure 14C:
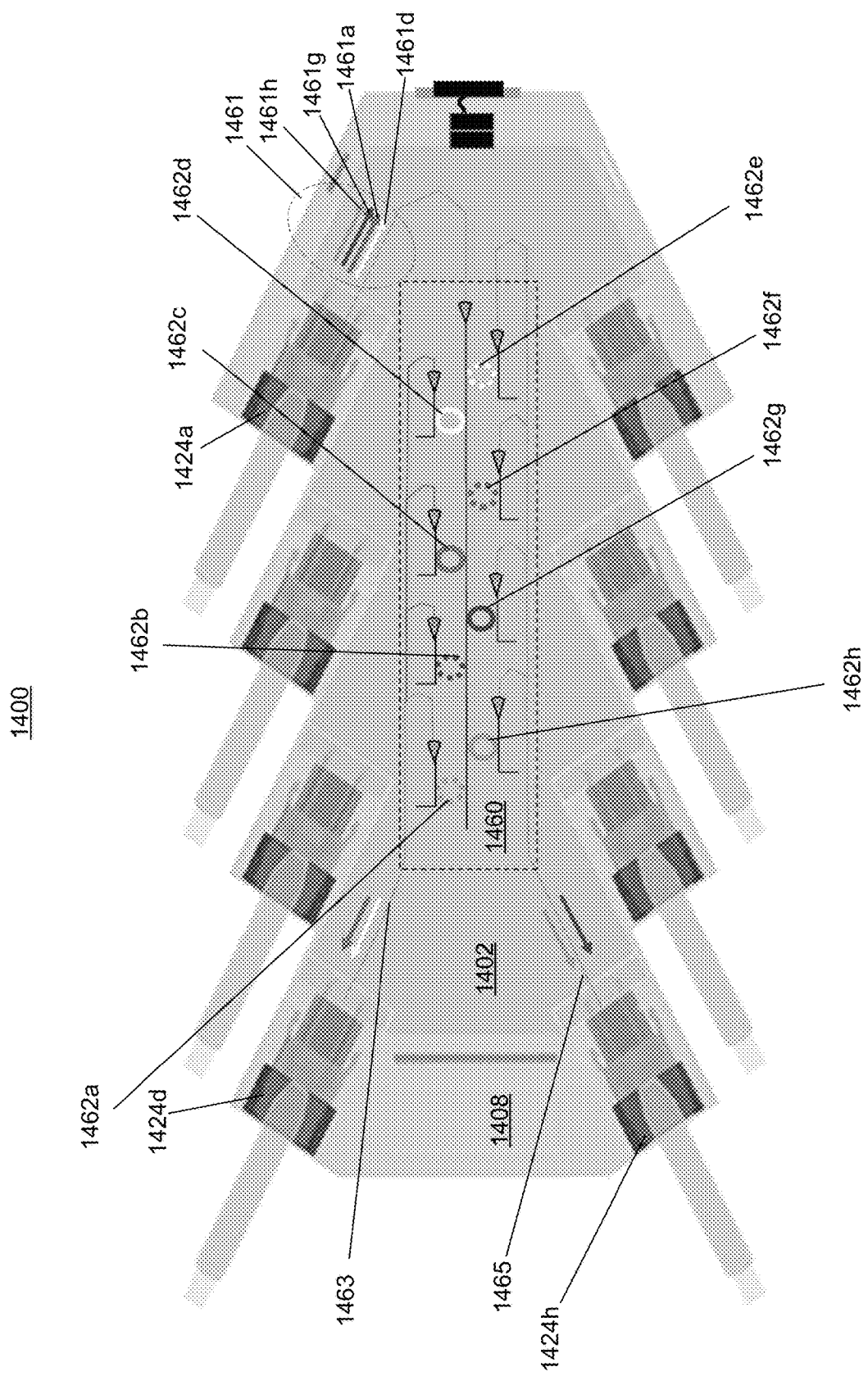
FIG. 14C is a top view of an example wavelength-shifting shuffle according to some embodiments.

FIG. 14C illustrates still another embodiment of WSS 1400 on which another PIC 1460 is installed. PIC 1460 may comprise eight micro-ring resonators 1462a-h. Micro-ring resonators 1462c and 1462d are tuned for first and second wavelengths (1461a and 1461d), respectively. The tuned first and second wavelengths (1461a, 1461d) may be dropped on the same output waveguide 1463 where they are combined (multiplexed), and the first and the second multiplexed wavelengths (1461a, 1461d) may then be coupled to a destination optical cable connector 1424d. Micro-ring resonators 1462g and 1462h are tuned to third and fourth wavelengths (1461g, 1461h), respectively. The tuned third and fourth wavelengths (1461g, 1461h) may be dropped on the same output waveguide 1465 where they are combined (multiplexed), and the third and the fourth multiplexed wavelengths (1461g, 1461h) may then be coupled to a destination optical cable connector 1424h. Micro-ring resonators 1462a, 1462b, 1462e and 1462f are not tuned to any wavelength. These four wavelengths may comport with the wavelengths of optical signals 1461 entering through a source optical cable connector 1424a. In this particular embodiment, depending on which micro-ring resonator is enabled, an optical signal of a particular wavelength can be routed to at least one destination optical cable connectors.

Figure 15:
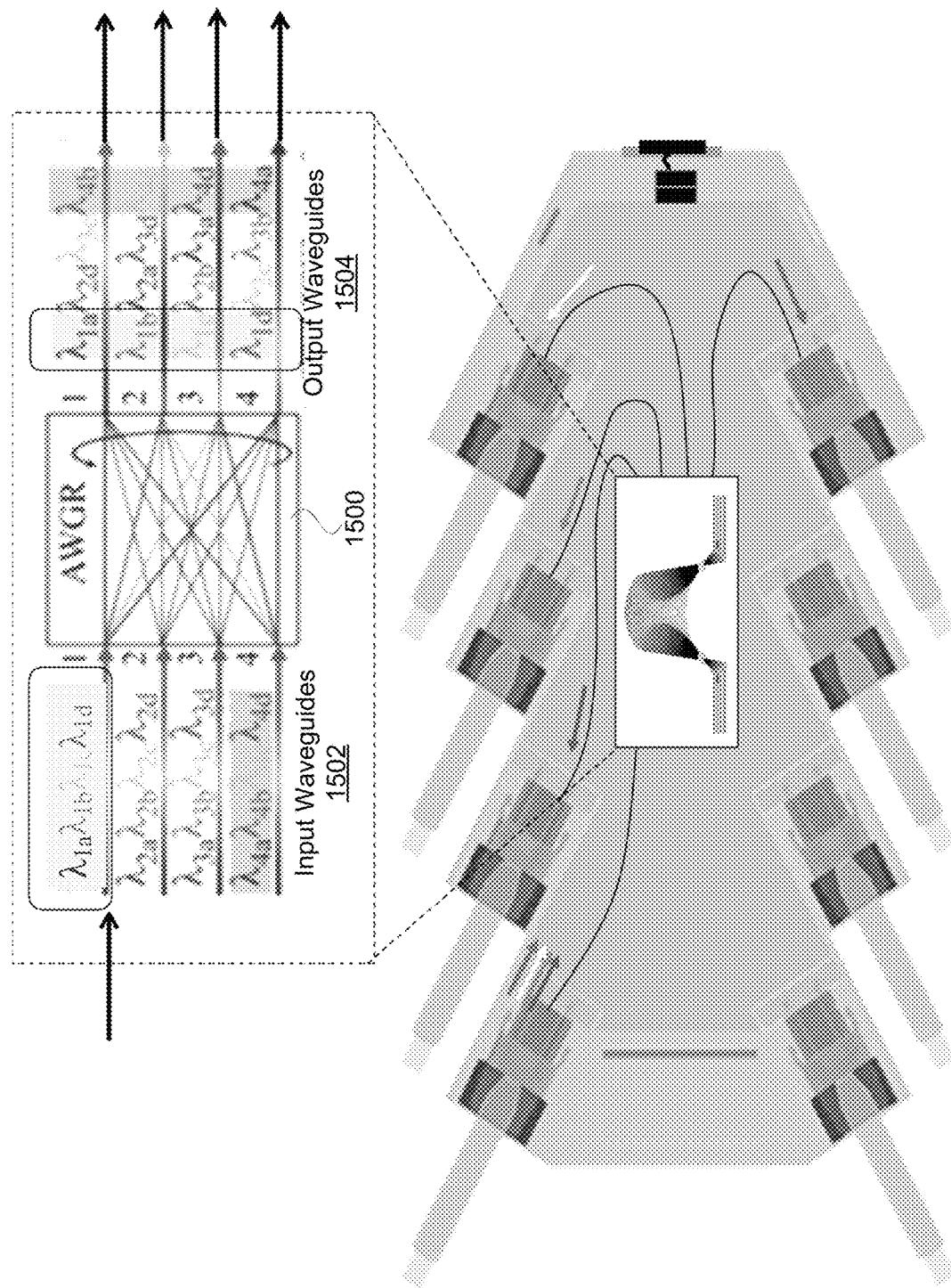
FIG. 15 is a schematic representation of an example wavelength-shifting shuffle on which an arrayed waveguide grating router is installed according to some embodiments.

In some embodiments, an arrayed waveguide grating router (AWGR) may be used in a PIC to allow a fan-out/fan-in or multiplex/de-multiplex wavelengths of a wavelength set corresponding to an optical signal. FIG. 15 illustrates a schematic representation of an example of AWGR-based wavelength routing in accordance with one embodiment. It should be understood that any wavelength of a wavelength set from each of multiple optical fibers can be designated to be routed from source to destination optical cable connectors depending on the manner in which the AWGR/waveguides are configured. In the example of FIG. 15, it can be appreciated that each of input waveguides 1502 may receive optical signal sets, each comprising four distinct wavelengths. Each wavelength of a wavelength set can be demultiplexed/multiplexed such that each wavelength (in one example, $\lambda_{1a}$, $\lambda_{1b}$, $\lambda_{1c}$, $\lambda_{1d}$) can each be routed to a different one of output waveguides 1504.

In some embodiments, AWGR may be an N×N AWGR that may be laser inscribed onto a WSS base. It should be understood that thermal tuning is not needed, as the N×N AWGR laser can switch tunable to be on or off. In some embodiments, an AWGR, such as AWGR 1500 may have Gaussian, flat-top, or dispersion-compensated designs for dense wavelength division multiplexing (DWDM) channels.

It should be understood that in addition to AWGRs and ring resonators, such as the micro-ring resonators described above, a mesh network of MZIs may also be used as wavelength routing components/elements with desired filter shapes. This allows for dynamic programming of various filter shapes which may be beneficial for wavelength registration, fabrication imperfections, and temperature effects. Similar to other embodiments described herein, such a mesh network can be implemented on a WSS base, such as a silicon or glass plate/block.

Figure 16:
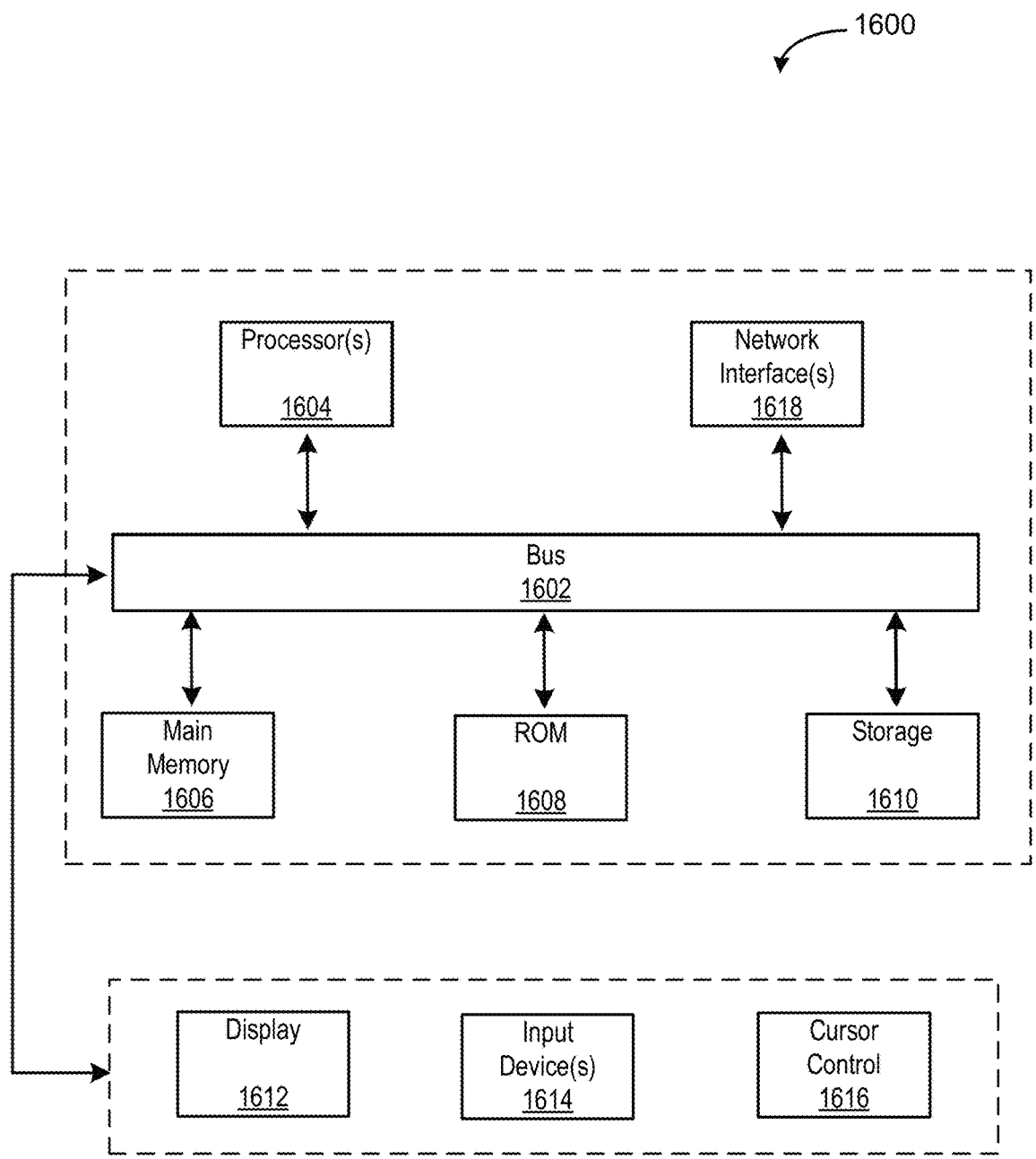
FIG. 16 is an example computing device or system in which embodiments described in the present disclosure may be implemented.

FIG. 16 depicts a block diagram of an example computer system 1600 in which various of the embodiments described herein may be implemented. The computer system 1600 includes a bus 1602, network, crossbar or other communication interconnect mechanism for communicating information, one or more hardware processors 1604 coupled with bus 1602 for processing information. Hardware processor(s) 1604 may be, for example, one or more general purpose microprocessors. In various embodiments, the one or more hardware processors 1604 may execute non-transitory machine-readable instructions to perform the various functions of the embodiments discussed with respect to FIGS. 7A-9C, for example.

The computer system 1600 also includes a main memory 1606, such as a random access memory (RAM), cache and/or other dynamic storage devices, coupled to bus 1602 or other communication interconnect mechanism for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 or other communication interconnect mechanism for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may further include a display 1612, input device 1614, and/or a cursor control 1616 coupled to bus 1602 or other communication interconnect mechanism for displaying, communicating, and entering information and/or commands. In some embodiments, the same direction information and command selections as cursor control may be implemented via receiving touches on a touch screen without a cursor. The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EEPROM. It will be further appreciated that hardware components may be comprised of connected logic units, such as gates and flip-flops, and/or may be comprised of programmable units, such as programmable gate arrays or processors.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a solid state drive, any other optical data storage medium, any physical medium with patterns of holes, a RAM, a PROM, and EEPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infrared data communications.

The computer system 1600 also includes a communication interface 1618 coupled to bus 1602 or other communication interconnect mechanism for enabling two way communication with one or more networks over one or more network links. For example, communication interface 1618 may be an integrated services digital network (ISDN) card, cable modem, satellite modem, a modem to provide a data communication connection to a corresponding type of telephone line, a local area network (LAN), a wide area network, or one or more types of wireless communication links.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. Alternatively, one or more embodiments necessarily include logic for deciding, with or without user input or prompting, whether these features, elements and/or steps are included or are to be performed in any particular embodiment.

The invention claimed is:

1. A waveguide shuffle block assembly, comprising:
a housing comprising a plurality of angled optical cable connector interface sockets;
a waveguide shuffle block enclosed within the housing effectuating connectivity between at least two of a plurality of angled optical cable ferrule/connector interfaces corresponding to the at least two of the plurality of angled optical cable ferrule/connector interface sockets, wherein the waveguide shuffle block comprises a plurality of integrated circuits and at least one photonic integrated circuit comprising at least one wavelength coupler with which connectivity between the at least two of the plurality of angled optical cable ferrule/connector interfaces, wherein the at least one photonic integrated circuit comprises a plurality of filters and a plurality of modulators, each of the plurality of integrated circuits is operatively connected between a filter of the plurality of filters and a modulator of the plurality of modulators, wherein an optical signal output from each of the plurality of modulators has a wavelength that is shifted to another wavelength relative to a wavelength of an optical signal entering the waveguide shuffle block; and
at least one retention mechanism maintaining the waveguide shuffle block assembly in a stacked formation with at least one other waveguide shuffle block assembly.

2. The waveguide shuffle block assembly of claim 1, wherein the at least one retention mechanism comprises at least one male coupling connector mateable with at least one female coupling connector of the at least one other waveguide shuffle block assembly, and at least one female coupling connector mateable with at least one male coupling connector of a third waveguide shuffle block assembly.

3. The waveguide shuffle block assembly of claim 2, wherein the at least one male coupling connector protrudes from a first planar surface with the waveguide shuffle block assembly, and wherein the at least one female coupling connector is inset within a second planar surface opposite the first planar surface.

4. The waveguide shuffle block assembly of claim 1, wherein the at least one retention mechanism is incorporated into at least one surface of the housing.

5. The waveguide shuffle block assembly of claim 1, wherein an angle of each of the angled optical cable connector interface sockets comprises an acute angle relative to at least one surface of the housing from which each of the plurality of angle optical cable connector interface sockets protrude.

6. The waveguide shuffle block assembly of claim 1, wherein the at least two of the plurality of angled optical cable ferrule/connector interfaces are partially enclosed by the at least two of the plurality of angled optical cable ferrule/connector interface sockets.

7. The waveguide shuffle block assembly of claim 6, wherein each of the plurality of optical cable ferrule/connector interfaces comprises one of a duplex fiber ferrule interface and a parallel fiber ferrule interface.

8. The waveguide shuffle block assembly of claim 1, wherein the waveguide shuffle block comprises at least one of a three-dimensional laser-written waveguide and a fiber connection for effectuating the connectivity between the at least two of the plurality of angled optical cable ferrule/connector interface sockets.

9. The waveguide shuffle block assembly of claim 1, wherein a first subset of the plurality of angled optical cable ferrule/connector interface sockets are provided along a first planar surface of the housing and a second subset of the plurality of angled optical cable ferrule/connector interface sockets are provided along a second planar surface of the housing opposite the first planar surface.

10. The waveguide shuffle block assembly of claim 9, wherein the first subset of the plurality of angled optical cable ferrule/connector interface sockets are angled in a first direction and the second subset of the plurality of angled optical cable ferrule/connector interface sockets are angled in a second direction.

11. The waveguide shuffle block assembly of claim 9, wherein first subset of the plurality of angled optical cable ferrule/connector interface sockets and the second subset of the plurality of angled optical cable ferrule/connector interface sockets are angled in different directions.

12. The waveguide shuffle block assembly of claim 1, wherein the at least one photonic integrated circuit comprises an arrayed waveguide grating router adapted to at least one of multiplex and de-multiplex one or more wavelengths of a set of wavelengths of an optical signal entering the waveguide shuffle block.

13. The waveguide shuffle block assembly of claim 1, wherein each of the filters of the plurality of filters and each of the modulators of the plurality of modulators are micro-ring resonators.

\* \* \* \* \*